United States Patent
Ma et al.

(10) Patent No.: US 9,125,003 B2
(45) Date of Patent: Sep. 1, 2015

(54) MACHINE TO MACHINE SERVICE MANAGEMENT DEVICE, NETWORK DEVICE, AND METHOD PROCESSING SERVICE SYSTEM

(71) Applicant: HUAWEI TECHNOLOGIES CO., LTD., Shenzhen (CN)

(72) Inventors: Jie Ma, Beijing (CN); Zhenxing Hu, Beijing (CN); Song Zhu, Beijing (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 14/057,389

(22) Filed: Oct. 18, 2013

(65) Prior Publication Data
US 2014/0045452 A1 Feb. 13, 2014

Related U.S. Application Data

(63) Continuation of application No. PCT/CN2012/074362, filed on Apr. 19, 2012.

(30) Foreign Application Priority Data

Apr. 19, 2011 (CN) .......................... 2011 1 0098192

(51) Int. Cl.
*H04W 4/00* (2009.01)
*H04L 29/08* (2006.01)
(Continued)

(52) U.S. Cl.
CPC ............. *H04W 4/005* (2013.01); *H04L 67/141* (2013.01); *H04L 67/28* (2013.01); *H04W 76/002* (2013.01); *H04W 4/021* (2013.01); *H04W 4/06* (2013.01)

(58) Field of Classification Search
USPC ........ 455/406, 435.1, 445, 450; 370/328, 338
See application file for complete search history.

(56) References Cited

U.S. PATENT DOCUMENTS

| 2004/0185837 | A1 | 9/2004 | Kim et al. |
| 2004/0227618 | A1 | 11/2004 | Hwang et al. |

(Continued)

FOREIGN PATENT DOCUMENTS

| CN | 1505411 | 6/2004 |
| CN | 1748386 | 3/2006 |

(Continued)

OTHER PUBLICATIONS

Chinese Office Action dated May 6, 2014 in corresponding Chinese Patent Application No. 201110098192.0.
(Continued)

*Primary Examiner* — Sam Bhattacharya
(74) *Attorney, Agent, or Firm* — Staas & Halsey LLP

(57) ABSTRACT

Embodiments of the present invention disclose a machine to machine service management device, a network device, a method processing service and system. An MSMC is added between an MTC server and a 3GPP network to perform service processing, and during the service processing, after a trigger receiving unit in the MSMC receives a triggering request message, a session establishing unit establishes a corresponding service session according to information of a requested group service, and a request sending and establishing unit sends a service request to a BM/SC device to establish a corresponding service session and establish a link with an MTC device. Therefore, security of a network system of the MTC application is improved.

34 Claims, 16 Drawing Sheets

(51) Int. Cl.
*H04W 76/00* (2009.01)
*H04W 4/06* (2009.01)
*H04W 4/02* (2009.01)

(56) References Cited

U.S. PATENT DOCUMENTS

| | | |
|---|---|---|
| 2005/0153715 A1 | 7/2005 | Hwang et al. |
| 2006/0010981 A1 | 1/2006 | Tadashi et al. |
| 2006/0176838 A1 | 8/2006 | Lee et al. |
| 2007/0005958 A1 | 1/2007 | Hsu et al. |
| 2009/0011768 A1* | 1/2009 | Seok et al. .................. 455/450 |
| 2012/0106431 A1 | 5/2012 | Wu et al. |
| 2013/0044596 A1 | 2/2013 | Zhi et al. |

FOREIGN PATENT DOCUMENTS

| | | |
|---|---|---|
| CN | 101039503 | 9/2007 |
| CN | 101184335 | 5/2008 |
| CN | 101568071 | 10/2009 |
| CN | 101860807 | 10/2010 |
| CN | 101895858 | 11/2010 |
| CN | 101959133 | 1/2011 |
| CN | 101969635 | 2/2011 |
| CN | 101977416 | 2/2011 |
| CN | 102014103 | 4/2011 |
| CN | 102111922 | 6/2011 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, pp. 290.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401, V10.3.0, Mar. 2011, pp. 278.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, V10.3.0, Mar. 2011, pp. 197.

PCT International Search Report and Written Opinion of the International Searching Authority dated Jul. 7, 2012 in corresponding International Patent Application No. PCT/CN2012/074362.

International Search Report mailed Jul. 12, 2012 in corresponding International Application No. PCT/CN2012/074362.

* cited by examiner

MACHINE TO MACHINE SERVICE MANAGEMENT DEVICE, NETWORK DEVICE, AND METHOD PROCESSING SERVICE SYSTEM

CROSS-REFERENCE TO RELATED APPLICATIONS

This application is a continuation of International Application No. PCT/CN2012/074362, filed on Apr. 19, 2012, which claims priority to Chinese Patent Application No. 201110098192.0, filed on Apr. 19, 2011, both of which are hereby incorporated by reference in their entireties.

TECHNICAL FIELD

Embodiments of the present invention relate to the field of communications technologies, and in particular, to a machine to machine service management device, a network device, and a method processing service and system.

BACKGROUND

Machine to machine (Machine to Machine, M2M), that is an Internet of things technology connects all things to the Internet through an information sensing device, so as to implement intelligent identification and management. A conventional M2M device is tightly combined with a wireless communications technology, so that an M2M technology has diversified applications, and when the M2M is applied to a mobile communication system, it is a machine type communication (Machine Type Communication, MTC).

Referring to FIG. 1, a specific MTC application system includes a third generation partnership project (3rd Generation Partnership Project, 3GPP) internal network and a 3GPP external network, and the 3GPP external network includes a plurality of MTC users (User) and corresponding MTC servers (server), where each MTC user is corresponding to one MTC server, and provides various MTC services for a client through communications with the corresponding MTC server, such as a vending machine service and a wireless water-electricity management service. An MTC device (device), that is, a terminal device is capable of accessing an MTC server from a 3GPP network and communicating with the MTC server, so as to receive a service provided by the MTC server.

In the conventional MTC application system, each MTC server may directly access a plurality of fixed network elements in the 3GPP network, so that the network elements in the 3GPP network are insecure.

SUMMARY

Embodiments of the present invention provide a machine to machine service management device, a network device, and a method processing service and system, thereby enhancing the security of a network.

An embodiment of the present invention provides a machine to machine (M2M) service management device, which includes: a trigger receiving unit connected to at least one machine type communication (MTC) server, a session establishing unit, and a request sending and establishing unit connected to a network device.

The trigger receiving unit is configured to receive a triggering request message sent from the machine type communication (MTC) server, where the triggering request message includes a service identifier corresponding to the MTC server and information of a requested group service.

The session establishing unit is configured to establish a corresponding service session according to the information of the requested group service of the triggering request message received by the trigger receiving unit.

The request sending and establishing unit is configured to send a service request to the network device, where the service request includes the service identifier and the information of the requested group service, so that the network device establishes a corresponding service session according to the service identifier and the information of the requested group service, and establishes links with at least two MTC devices corresponding to the requested group service.

An embodiment of the present invention provides a network device, which includes: a first request receiving unit, configured to receive a service request sent from a machine to machine (M2M) service management device, where the service request includes a service identifier corresponding to a machine type communication (MTC) server and information of a requested group service; a first service session establishing unit, configured to establish a corresponding service session according to the information of the requested group service; and a first link establishing unit, configured to acquire information of a corresponding mobility management entity (MME) or serving general packet radio service support node (SGSN) according to the service identifier and the information of the requested group service, and establish, through the MME or SGSN, a link with an MTC device corresponding to the requested group service.

An embodiment of the present invention provides a network device, which includes: a second request receiving unit, configured to receive a triggering request message sent from a machine type communication (MTC) server, where the triggering request message includes a service identifier corresponding to the MTC server and information of a requested group service; a second service session establishing unit, configured to establish a corresponding service session according to the information of the requested group service; and a second link establishing unit, configured to acquire information of a corresponding mobility management entity (MME) or serving general packet radio service support node (SGSN) according to the service identifier and the information of the requested group service, and establish, through the MME or SGSN, a link with an MTC device corresponding to the requested group service.

An embodiment of the present invention provides a machine to machine (M2M) service management device, which includes: a single trigger receiving unit, configured to receive an MTC device triggering request message sent from a machine type communication (MTC) server, where the MTC device triggering request message includes a service identifier corresponding to the MTC server, service information requested for triggering, and an MTC device identifier requested for triggering; an acquiring and establishing unit, configured to acquire, according to the MTC device identifier requested for triggering, information of an MME or SGSN where the MTC device is located, and establish a service session of the service identifier corresponding to the MTC server and a service session of the service information requested for triggering; and a paging unit, configured to send the MTC device triggering request message carrying the MTC device identifier to the MME or SGSN, so that the MME or SGSN establishes a paging link of the MTC device.

An embodiment of the present invention provides a service processing system, which includes: at least one machine type communication (MTC) server, a machine to machine service management device MSMC, and a network device.

The MTC server is communicated to the MSMC and is configured to send a triggering request message to the MSMC, where the triggering request message includes a service identifier corresponding to the MTC server and information of a requested group service.

The MSMC is configured to receive the triggering request message sent from the machine type communication (MTC) server, where the triggering request message includes the service identifier corresponding to the MTC server, and the information of the requested group service; establish a corresponding service session according to the information of the requested group service in the received triggering request message; and send a service request to the network device, where the service request includes the service identifier and the information of the requested group service.

The network device is configured to receive the service request sent from the machine to machine (M2M) service management device, where the service request includes the service identifier corresponding to the machine type communication (MTC) server, and the information of the requested group service; establish a corresponding service session according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

An embodiment of the present invention provides a service processing system, which includes: at least one machine type communication (MTC) server and a network device.

The MTC server is communicated to the network device and is configured to send a triggering request message to the network device, where the triggering request message includes a service identifier corresponding to the MTC server and information of a requested group service.

The network device is configured to receive the triggering request message sent from the machine type communication (MTC) server, where the triggering request message includes the service identifier corresponding to the MTC server, and the information of the requested group service; establish a corresponding service session according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

An embodiment of the present invention provides a method processing service, which includes: receiving a triggering request message sent from a machine type communication (MTC) server, where the triggering request message includes a service identifier corresponding to the MTC server and information of a requested group service; establishing a corresponding service session according to the information of the requested group service; and sending a service request to a multimedia broadcast/multicast service network device, where the service request includes the service identifier and the information of the requested group service, so that the network device establishes a corresponding service session according to the service identifier and the information of the requested group service, and establishes links with at least two MTC devices corresponding to the requested group service.

An embodiment of the present invention provides a method processing service, which includes: receiving a service request or a triggering request message sent from a machine to machine (M2M) service management device, where the service request or triggering request message includes a service identifier corresponding to a machine type communication (MTC) server and information of a requested group service; establishing a corresponding service session according to the information of the requested group service; and acquiring information of a corresponding mobility management entity (MME) or serving general packet radio service support node (SGSN) according to the service identifier and the information of the requested group service, and establishing, through the MME or SGSN, a link with an MTC device corresponding to the requested group service.

In the embodiments of the present invention, an MSMC is added between an MTC server and a 3GPP network to perform service processing, and during the service processing, after a trigger receiving unit in the MSMC receives a triggering request message, a session establishing unit establishes a corresponding service session according to information of a requested group service, and a request sending and establishing unit sends a service request to a network device to establish a corresponding service session and establish a link with an MTC device. Therefore, when an M2M technology is applied to a mobile communication system, that is, an MTC application, a comprehensive management device, that is, an MSMC, may be used to access a 3GPP internal network device, rather than that each MTC server directly accesses the 3GPP internal network device, thereby improving the security of a network system of the MTC application.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
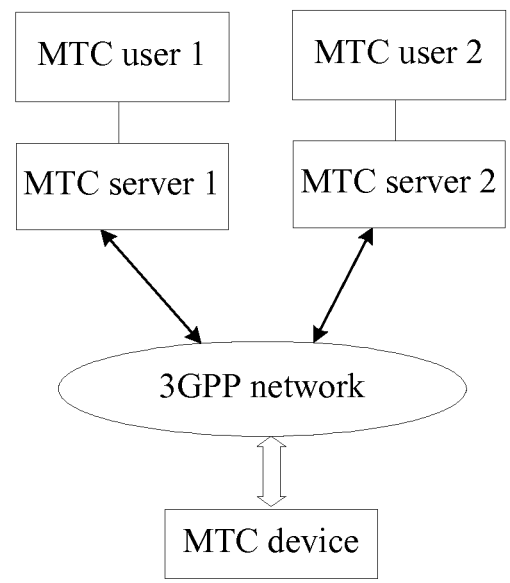
FIG. 1 is a schematic structural diagram of an MTC application system in the prior art.
Figure 2:
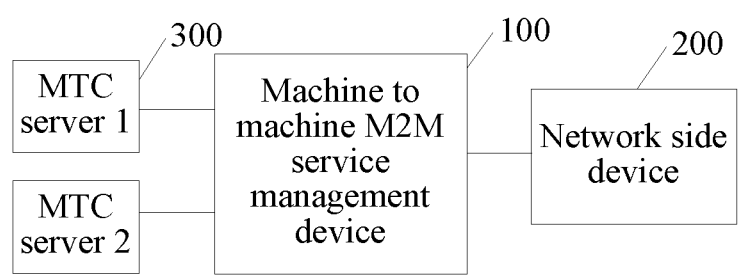
FIG. 2 is a schematic structural diagram of a service processing system according to an embodiment of the present invention.

A system and a device are provided in an embodiment of the present invention:

An embodiment of the present invention provides a service processing system, and a schematic structural diagram is shown in FIG. 2. The system includes a machine to machine (M2M) service management device (M2M service management center, hereinafter referred to as MSMC) 100, a network device 200 (a device such as a multimedia broadcast/multicast service (Multimedia Broadcast/Multicast Service, hereinafter referred to as BM/SC)) in a 3GPP internal network, and at least one MTC server 300. In the system, the MTC server 300 is communicated to a 3GPP network through the MSMC 100, for example, the MTC server 300 is communicated to the network device 200, such as the BM/SC device, in the 3GPP network through the MSMC 100.

The MTC server 300 in the system is a server providing an Internet of things service for an MTC device, and is configured to send a request message to the MSMC 100, such as a triggering request message and a service configuration request message, and receive a response message returned by the MSMC 100; and specific content of a message interacted between the MTC server 300 and the MSMC 100 is described in detail subsequently.

The MSMC 100 may be connected to at least one MTC server 300 and is communicated to a network element in the 3GPP network, and is capable of comprehensively managing communications between these MTC servers 300 and the network element in the 3GPP network. The MSMC 100 is configured to receive a triggering request message sent from the machine type communication (MTC) server 300, where the triggering request message includes a service identifier corresponding to the MTC server and information of a requested group service; establish a corresponding service session according to the information of the requested group service in the received triggering request message; and send a service request to the network device 200, where the service request includes the service identifier and the information of the requested group service.

The network device 200 is configured to receive the service request sent from the machine to machine (M2M) service management device 100, where the service request includes the service identifier corresponding to the machine type communication (MTC) server, and the information of the requested group service; establish a corresponding service session according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

In this way, a service session of a group service is established through interaction between the MTC server 300, the MSMC 100, and the network device 200, and in a subsequent service data transmission process, the MSMC 100 is further configured to, when receiving uplink service data that is reported by the MTC device through the network device, collect related charging statistics according to the established service session, and converge and deliver the uplink service data to the MTC server 300; and when receiving downlink service data sent from the MTC server 300, deliver the downlink service data to the MTC device through a link with the network device 200.

Specifically, in the system in this embodiment.

Figure 3:
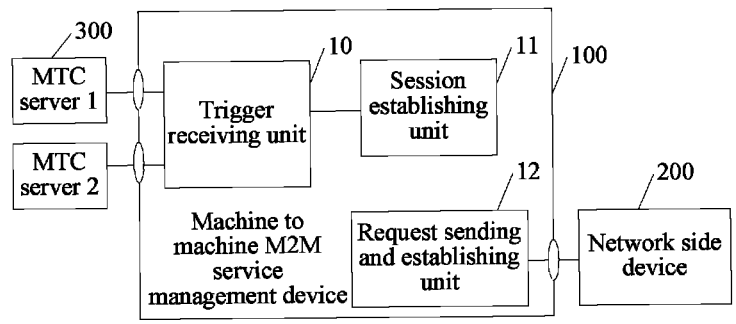
FIG. 3 is a schematic structural diagram of an MSMC in a service processing system according to an embodiment of the present invention.

A schematic structural diagram of the MSMC 100 is shown in FIG. 3, which includes: a trigger receiving unit 10 connected to the at least one machine type communication (MTC) server 300, a session establishing unit 11, and a request sending and establishing unit 12 connected to the network device in the 3GPP network.

The trigger receiving unit 10 is configured to receive a triggering request message sent from the machine type communication (MTC) server 300, where the triggering request message includes a service identifier (Service ID) corresponding to the MTC server 300 and information of a requested group service.

Herein, the service identifier corresponding to the MTC server 300 is allocated by the MSMC 100 for the MTC server 300 in a process of initial configuration of the MSMC 100, each MTC server 300 is corresponding to one service identifier, each MTC server 300 has a plurality of services, and one type of services corresponding to at least two MTC devices is referred to as a group service; and the information of the requested group service may include: a type of the requested group service such as a periodic triggering service and a monitoring service, and a feature parameter of the group service such as a period and a delay requirement.

It may be understood that, the triggering request message received by the trigger receiving unit 10 may further include basic information that forms a message, such as a source address and a destination address.

The session establishing unit 11 is configured to establish a corresponding service session (session) according to the information of the requested group service of the triggering request message received by the trigger receiving unit 10.

When establishing the corresponding service session, the session establishing unit 11 may generate, according to information such as the type of the requested group service and the feature parameter, necessary data for performing corresponding group service processing, such as a charging initial value; and start a necessary function for performing the group service processing, for example, start a timer. In this way, the corresponding service session is established.

It may be understood that, before the service session is established, the session establishing unit 11 may search, according to the service identifier included of the triggering request message, for a context corresponding to the MTC server 300; and determine whether the triggering request is allowable, if the triggering request is allowable, establish the service session, and if the triggering request is unallowable, feedback a response message to the MTC server 300 to notify the MTC server 300 of a triggering request failure.

The request sending and establishing unit 12 is configured to send a service request to the network device 200, where the service request includes the service identifier and the information of the requested group service.

In this way, after receiving the service request sent from the request sending and establishing unit 12, the network device 200 establishes a corresponding service session according to the service identifier and the information of the requested group service in the service request, and establishes links with at least two MTC devices corresponding to the requested group service.

For example, the network device 200 may first generate, according to information such as the type of the requested group service and the feature parameter, necessary data for performing corresponding group service processing, such as a charging initial value; and start a necessary function for performing the group service processing, for example, start a timer. In this way, the corresponding service session is established.

During establishing a link, the network device 200 may search locally, according to the service identifier in the service request, for information of a mobility management entity (Mobility Management Entity, MME) or serving general packet radio service support node (Serving GPRS Support Node, SGSN) where the MTC device corresponding to the requested group service is located, and establish, through the found MME (or SGSN), a link with the MTC device.

The MSMC 100 and the network device 200 mentioned above are 3GPP internal network devices, and communications between units in the MSMC 100 is performed through a query command (Query Command), for example, the trigger receiving unit 10 may send the received triggering request message to the session establishing unit 11 through a query command, so as to perform establishment of a session, and the like.

It can be seen that, in the embodiment of the present invention, an MSMC 100 is added between an MTC server 300 and a 3GPP network to perform service processing, and during the service processing, after a trigger receiving unit 10 in the MSMC 100 receives a triggering request message, a session establishing unit 11 establishes a corresponding service session according to information of a requested group service, and a request sending and establishing unit 12 sends a service request to a network device 200 to establish a corresponding service session and establish a link with an MTC device. Therefore, when an M2M technology is applied to a mobile communication system, that is, an MTC application, a comprehensive management device, that is, an MSMC, may be used to access a 3GPP internal network device, rather than that each MTC server directly accesses the 3GPP internal network device, thereby improving the security of a network system of the MTC application.

Figure 4:
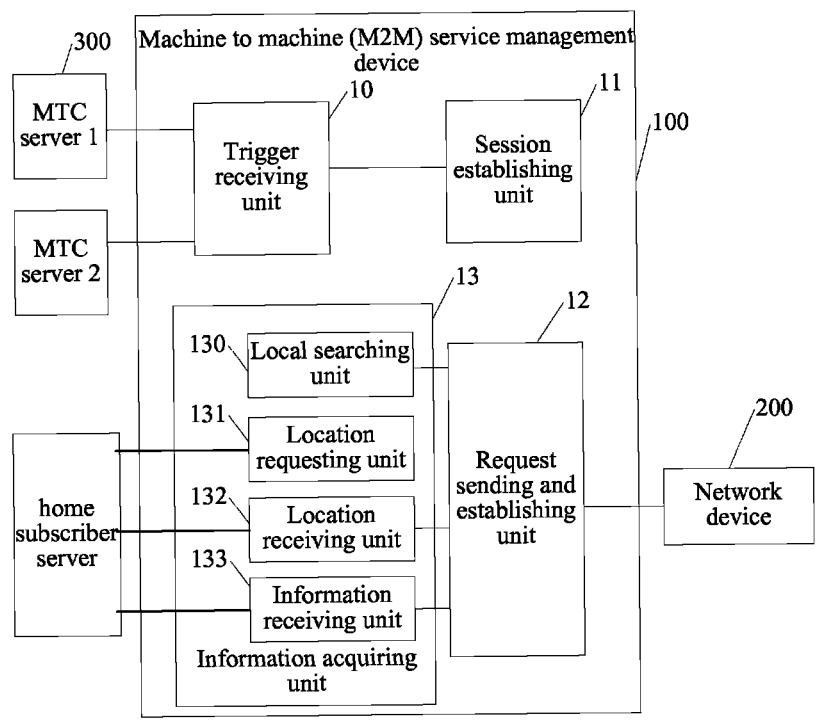
FIG. 4 is a schematic structural diagram of another MSMC in a service processing system according to an embodiment of the present invention.

Referring to FIG. 4, in a specific embodiment, an MSMC 100 in a system may include: a trigger receiving unit 10, a session establishing unit 11, a request sending and establishing unit 12, and an information acquiring unit 13.

The information acquiring unit 13 is configured to acquire information of a mobility management entity (MME) or serving general packet radio service support node (SGSN) where an MTC device corresponding to a requested group service is located.

It may be understood that, when establishing a link with an MTC device, a network device 200 needs to first acquire information of an MME or SGSN where an MTC device corresponding to a requested group service is located, and the information of the MME or SGSN may be stored in the network device 200, or may be sent from the MSMC 100 to the network device 200.

In this embodiment, after the information acquiring unit 13 in the MSMC 100 acquires the information of the MME or SGSN, the request sending and establishing unit 12 carries the acquired information of the MME or SGSN in a service request, and sends the service request to the network device 200, so that the network device 200 establishes, through the corresponding MME or SGSN, the link with the MTC device corresponding to the requested group service.

For example, the information acquiring unit 13 may include a searching unit 130, and/or a location requesting unit 131 and a location receiving unit 132, and/or a subscription receiving unit 133.

The searching unit 130 is configured to search a local storage for the information of the MME or SGSN corresponding to the requested group service.

The location requesting unit 131 is communicated to a home subscriber server (HSS), and is configured to send a location query request to the HSS, where the location query request includes information of the requested group service; and request searching for the information of the mobility management entity (MME) or serving general packet radio service support node (SGSN) corresponding to the information of the requested group service.

The location receiving unit 132 is communicated to the HSS, and is configured to receive the information of the MME or SGSN, where the information of the MME or SGSN is returned by the HSS according to the location query request.

The subscription receiving unit 133 is communicated to the HSS, and is configured to receive subscription information that is corresponding to the MTC server and is sent from the home subscriber server (HSS), and parse the subscription information to acquire the information of the MME or SGSN.

In this embodiment, if the MSMC 100 stores correspondence between a group service and information of an MME (or SGSN), the information of the MME (or SGSN) corresponding to the requested group service may be found through the searching unit 130.

The MSMC 100 may also send the location query request to the HSS through the location requesting unit 131, and after the HSS receives the location query request, the HSS searches for and returns the information of the MME or SGSN where the requested group service is located, and the location receiving unit 132 receives the information of the MME or SGSN, where the information of the MME or SGSN is found by the HSS.

The MSMC 100 may also receive, through the subscription receiving unit 133, the subscription information that is corresponding to the MTC server and is sent from the HSS, and parse the subscription information to acquire the information of the MME or SGSN where the requested group service is located.

Figure 5:
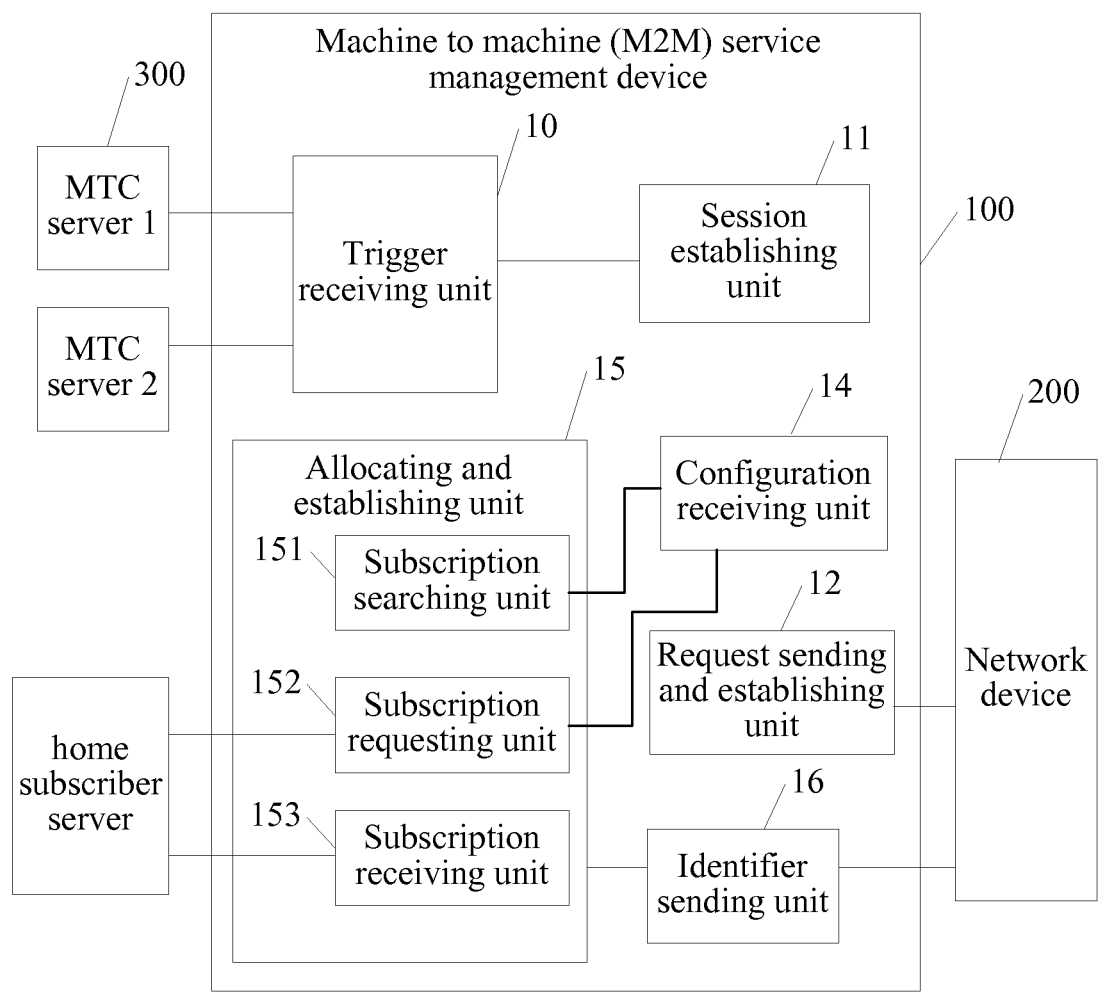
FIG. 5 is a schematic structural diagram of another MSMC in a service processing system according to an embodiment of the present invention.

Referring to FIG. 5, in another specific embodiment, an MSMC 100 in a system may include: a trigger receiving unit 10, a session establishing unit 11, a request sending and establishing unit 12, a configuration receiving unit 14, an allocating and establishing unit 15, and an identifier sending unit 16.

The configuration receiving unit 14 is communicated to an MTC server 300 (a connection relationship is not shown in the figure), and is configured to receive a service configuration request message sent from the MTC server 300, where the service configuration request message includes identifier information of the MTC server 300.

It may be understood that, before the MSMC 100 executes the foregoing group service processing process, that is, before an operation such as establishment of a service session, configuration for the MSMC 100 needs to be initiated through the MTC server 300. The configuration receiving unit 14 receives the service configuration request message sent from the MTC server 300, where the included identifier information of the MTC server 300 may be an address identifier of the MTC server, and may also be a device identifier of the MTC server.

The allocating and establishing unit 15 is configured to acquire subscription information corresponding to the identifier information of the MTC server 300 in the service configuration request message received by the configuration receiving unit 14, allocate a corresponding service identifier for a service of the MTC server 300, and establish, according to the subscription information, a context corresponding to the service of the MTC server 300.

The subscription information corresponding to the MTC server 300 may be stored in an HSS or MSMC, and when acquiring the subscription information, the allocating and establishing unit 15 may search for the subscription information locally or request the HSS for the subscription information.

When the allocating and establishing unit 15 acquires the subscription information, it may be implemented by using the following structure, and specifically, the allocating and establishing unit 15 may include a subscription searching unit 151, and/or a subscription requesting unit 152 and a subscription receiving unit 153, where the subscription searching unit 151 is configured to search a local storage for the subscription information corresponding to the identifier information of the MTC server 300; the subscription requesting unit 152 is communicated to the HSS and is configured to send a subscription request message to the HSS, where the subscription request message includes the identifier information of the MTC server 300; and the subscription receiving unit 153 is also connected to the HSS and is configured to receive the subscription information that is returned by the HSS according to the identifier information of the MTC server 300.

It should be noted that, if the identifier information of the MTC server included in the service configuration request message received by the configuration receiving unit 14 is non-3GPP protocol identifier information, that is, 3GPP external identifier information, the allocating and establishing unit 15 first needs to map the identifier information of the MTC server into 3GPP internal identifier information, that is, 3GPP protocol identifier information, and then acquires the corresponding subscription information; and the allocating and establishing unit 15 specifically stores the acquired subscription information when establishing the context.

The identifier sending unit 16 is configured to send, to the MTC server, the service identifier allocated by the allocating and establishing unit 15. The identifier sending unit 16 may carry the allocated service identifier in a service configuration response message, and send the service configuration response message to the MTC server 300.

In this embodiment, the MTC server 300 initiates the initial configuration for the MSMC 100, when the configuration receiving unit 14 receives the service configuration request message, the allocating and establishing unit 15 acquires the subscription information corresponding to the identifier information of the MTC server 300, allocates the service identifier and establishes the context, and the identifier sending unit 16 sends the allocated service identifier to the MTC server 300, thereby implementing initial configuration of group service processing performed by the MTC server 300 on the MSMC 100.

It should be noted that, in a process of initial configuration, if the service configuration request message received by the configuration receiving unit 14 not only includes the identifier information of the MTC server, but also includes periodic triggering service information and/or monitoring service information requested for configuration, such as a triggering period of a periodic triggering service, that is, a service in the MSMC 100, which is requested by the MTC server 300 for configuration, includes a periodic triggering service and/or a monitoring service; at the same time when the allocating and establishing unit 15 acquires the subscription information, allocates the service identifier, and establishes the context, the session establishing unit 11 is further configured to establish a corresponding service session according to the periodic triggering service information and/or monitoring service information requested for configuration; and the request sending and establishing unit 12 is further configured to send a periodic triggering and/or monitoring service request to a network device 200, where the periodic triggering and/or monitoring service request includes the service identifier and information of a requested periodic triggering and/or monitoring service, so that network device 200 establishes a corresponding service session according to the service identifier and the information of the requested periodic triggering and/or monitoring service, and establishes links with at least two MTC devices corresponding to the requested periodic triggering and/or monitoring service.

It can be seen that, in the MSMC 100, the MTC server 300 may be used to send a triggering request message to trigger a procedure of group service processing, that is, when the trigger receiving unit 10 receives the triggering request message, the session establishing unit 11 establishes a session, and the request sending and establishing unit 12 sends a service request.

For the periodic triggering service or the monitoring service, in a process of initial configuration of the MSMC 100, the procedure of the group service processing may be triggered according to the acquired subscription information, that is, when the allocating and establishing unit 15 acquires the subscription information, the session establishing unit 11 establishes the session, and the request sending and establishing unit 12 sends the service request.

Figure 6:
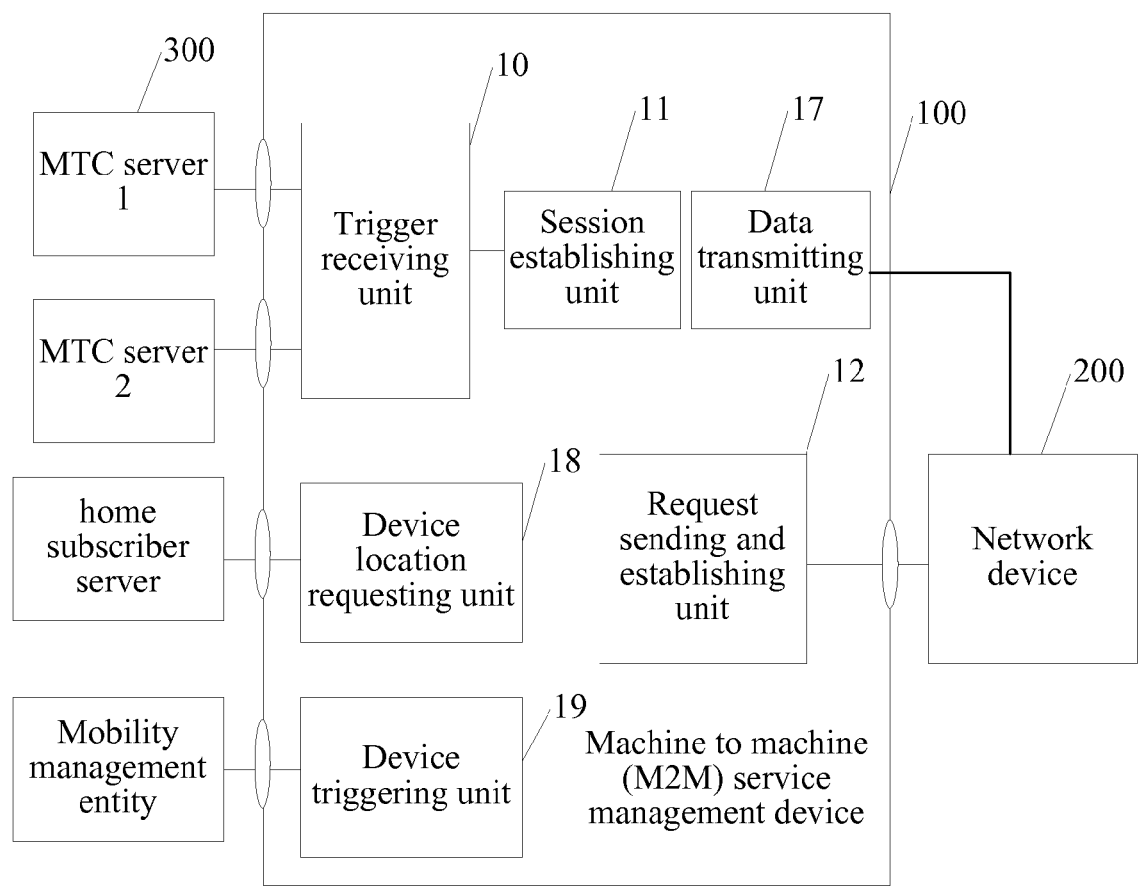
FIG. 6 is a schematic structural diagram of another MSMC in a service processing system according to an embodiment of the present invention.

Referring to FIG. 6, in another specific embodiment, an MSMC 100 in a system may include: a trigger receiving unit 10, a session establishing unit 11, a request sending and establishing unit 12, a data transmitting unit 17, a device location requesting unit 18, and a device triggering unit 19.

The data transmitting unit 17 is configured to, when receiving uplink service data that is reported by an MTC device through a network device 200, collect related charging statistics according to a service session established by the session establishing unit 11, and converge and deliver the uplink service data to an MTC server 300; and when receiving downlink service data sent from the MTC server 300, deliver the downlink service data to the MTC device through a link with the network device 200.

For example, when the related charging statistics is collected, group service data may be charged according to information such as a type of a service in the service session, quality of service (QoS) of uplink data transmission, and a charging policy.

The device location requesting unit 18 is communicated to an HSS and is configured to send a location query request message to the home subscriber server (HSS), where the location query request message includes an MTC device identifier.

The device triggering unit 19 is communicated to the HSS and an MME, and is configured to, when receiving information of the MME or an SGSN, where the information of the MME or the SGSN is returned by the HSS according to the MTC device identifier, send an MTC device triggering request message carrying the MTC device identifier to the MME or the SGSN, so that MME or the SGSN establishes a paging link of the MTC device.

In the MSMC 100 in this embodiment, through cooperation of the trigger receiving unit 10, the session establishing unit 11, and the request sending and establishing unit 12, a service session is established on the MSMC 100 and the network device 200, and then uplink and downlink data of a group service may be transmitted through the data transmitting unit 17.

If a triggering request message received by the trigger receiving unit 10 is an MTC device triggering request message, that is, a service corresponding to one MTC device, the MTC device triggering request message further includes an MTC device identifier requested for triggering; after the session establishing unit 11 establishes a service session corresponding to a service of a corresponding MTC device, that is, a service session corresponding to the MTC device identifier and information of a requested group service, the device location requesting unit 18 sends the location query request to the HSS, and when receiving the information of the MME or the SGSN returned by the HSS, the device triggering unit 19 sends the MTC device triggering request message to the MME or the SGSN to establish the paging link of the corresponding MTC device.

It may be understood that, the MSMC 100 not only can trigger a procedure of a group service (that is, one type of services corresponding to a plurality of MTC devices) through cooperation of the trigger receiving unit 10, the session establishing unit 11 and the request sending and establishing unit 12, but also can trigger, through cooperation of the trigger receiving unit 10, the session establishing unit 11, the device location requesting unit 18, and the device triggering unit 19, a service corresponding to a single MTC device.

Figure 7:
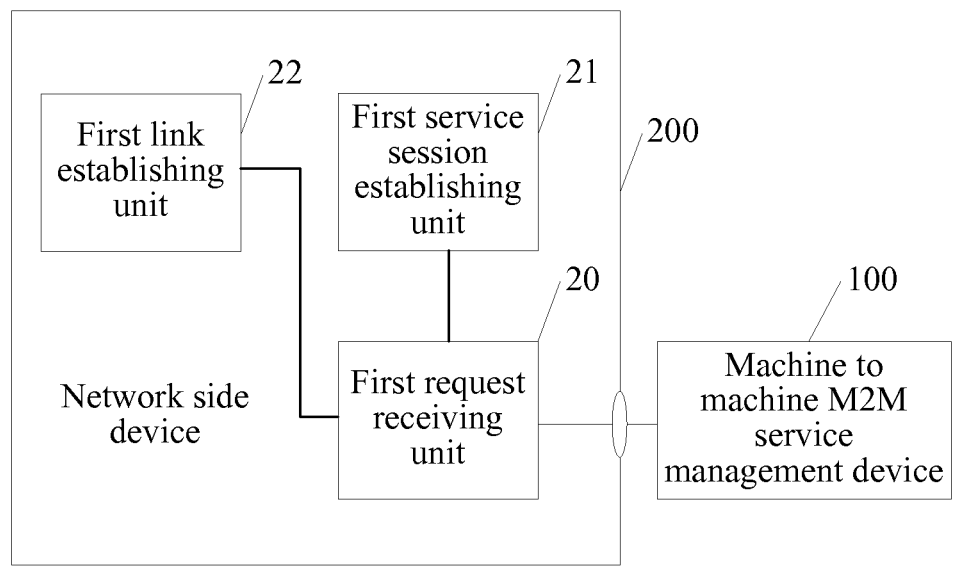
FIG. 7 is a schematic structural diagram of a network device in a service processing system according to an embodiment of the present invention.

In a service processing system according to the embodiment of the present invention, FIG. 7 is a schematic structural diagram of the network device 200, which includes: a first request receiving unit 20 connected to an MSMC, a first service session establishing unit 21, and a first link establishing unit 22.

The first request receiving unit 20 is configured to receive a service request sent from a machine to machine (M2M) service management device 100, where the service request includes a service identifier corresponding to a machine type communication (MTC) server and information of a requested group service.

It may be understood that, the service identifier corresponding to the MTC server is a service identifier allocated by the MSCS 100 for a service of an MTC server 300 in a process of initial configuration performed by the MTC server on the MSMC 100.

The first service session establishing unit 21 is configured to establish a corresponding service session according to the information of the requested group service in the service request received by the first request receiving unit 20.

After establishing the service session, the first service session establishing unit 21 stores the service session and the service identifier in a correspondence manner.

The first link establishing unit 22 is configured to acquire information of a corresponding mobility management entity (MME) or serving general packet radio service support node (SGSN) according to the service identifier and the information of the requested group service in the service request received by the first request receiving unit 20, and establish, through the MME or SGSN, links with at least two MTC devices corresponding to the requested group service.

The first link establishing unit 22, before establishing a link with an MTC device, needs to acquire information of an MME or SGSN where the MTC device corresponding to the requested group service in the service request is located; and when acquiring the information of the MME or SGSN, the first link establishing unit 22 may search for the information locally, may acquire the information by sending a request to an HSS, or may receive the information sent from the MSMC 100.

It can be seen that in the embodiment of the present invention, an MSMC 100 is added between an MTC server 300 and a 3GPP network to perform service processing, and during the service processing, the MSMC 100 sends a service request to a network device 200 in the 3GPP network, so that after a first request receiving unit 20 in a BM/SC device receives a triggering request message, a first service session establishing unit 21 establishes a corresponding service session according to information of a requested group service, and a first link establishing unit 22 establishes a link with an MTC device. Therefore, when an M2M technology is applied to a mobile communication system, that is, an MTC application, an MSMC may be used to access a 3GPP internal network device, rather than that an MTC server directly accesses the 3GPP internal network device, thereby improving the security of a network system of the MTC application.

It should be noted that, the MSMC 100 and the network device 200 in the service processing system according to a first embodiment of the present invention may also have other unit division structures, for example, in the MSMC 100, a functional module may be used to implement structures of the trigger receiving unit 10 and the session establishing unit 11.

Figure 8:
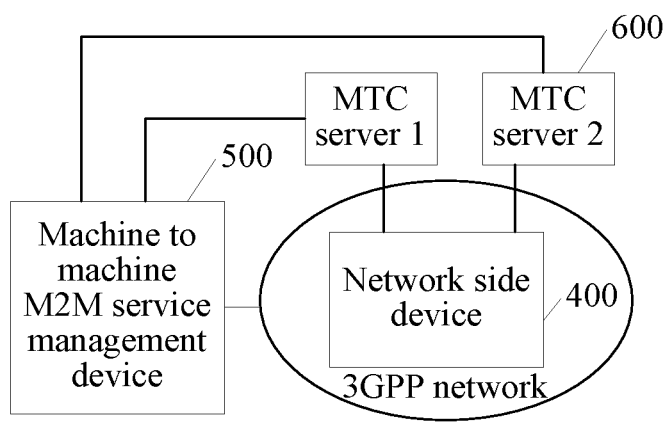
FIG. 8 is a schematic structural diagram of a service processing system according to another embodiment of the present invention.

A system and device embodiment is provided in another embodiment of the present invention:

An embodiment of the present invention provides a service processing system, and a schematic structural diagram is shown in FIG. 8. The system includes a network device 400, such as a BM/SC device, and at least one MTC server 600; and in this case, the MTC server 600 may be directly connected to the network device 400 in a 3GPP network, so as to perform group service processing.

It may be understood that, the service processing system may further include an MSMC 500, and the MTC server 600 is communicated to another network element in the 3GPP network through the MSMC 500, for example, is communicated to a network element such as an MME or SGSN in the 3GPP network, so as to perform service processing of a single MTC device, where:

The MTC server 600 is a server providing an Internet of things service for an MTC device, and is configured to send a request message to the network device 400, such as a triggering request message and a service configuration request message, and receive a response message returned by the network device 400; and specific content of a message interacted between the MTC server 600 and the network device 400 is described in detail subsequently.

The network device 400 is a network element in the 3GPP network, is communicated to at least one MTC server 600, and is configured to establish a group service session between the MTC server 600 and the MTC device, and transmit group service data. The network device 400 is configured to receive a triggering request message sent from the machine type communication (MTC) server 600, where the triggering request message includes a service identifier corresponding to the MTC server and information of a requested group service; establish a corresponding service session according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

In this way, a service session of a group service is established through interaction between the MTC server 600 and the network device 400, so as to perform transmission of group service data.

Figure 9:
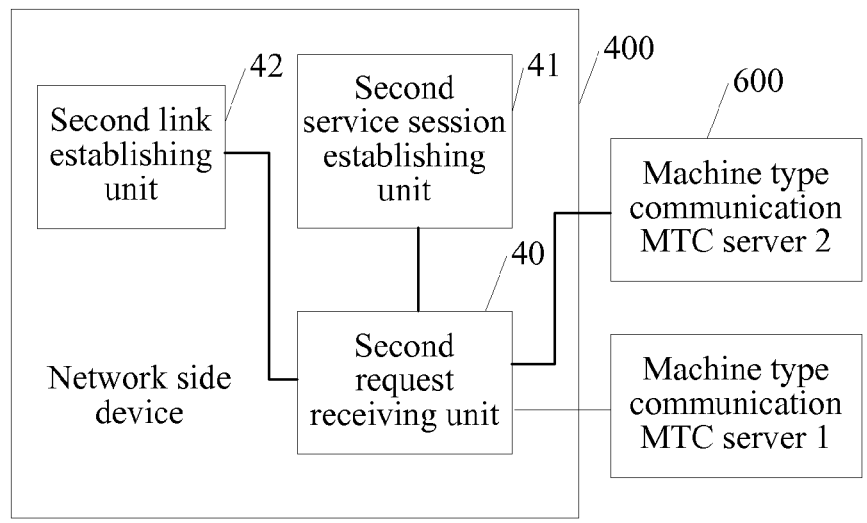
FIG. 9 is a schematic structural diagram of a network device in a service processing system according to another embodiment of the present invention.

Specifically, in a system according to another embodiment of the present invention:

A schematic structural diagram of a network device 400, such as a multimedia broadcast/multicast service BM/SC device, in this system is shown in FIG. 9, which includes: a second request receiving unit 40 connected to an MTC server, a second service session establishing unit 41, and a second link establishing unit 42.

The second request receiving unit 40 is configured to receive a triggering request message sent from a machine type communication (MTC) server 600, where the triggering request message includes a service identifier corresponding to the MTC server and information of a requested group service.

It may be understood that, herein the service identifier corresponding to the MTC server 600 is a service identifier allocated by the network device 400 for a service of the MTC server 600 in a process of initial configuration performed by the MTC server 600 on the network device 400.

The second service session establishing unit 41 is configured to establish a corresponding service session according to the information of the requested group service of the triggering request message received by the second request receiving unit 40.

After establishing the service session, the second service session establishing unit 41 stores the service session and the service identifier in a correspondence manner.

The second link establishing unit 42 is configured to acquire information of a corresponding mobility management entity (MME) or serving general packet radio service support node (SGSN) according to the service identifier and the information of the requested group service of the triggering request message received by the second request receiving unit 40, and establish, through the MME or SGSN, a link with an MTC device corresponding to the requested group service.

The second link establishing unit 42, before establishing the link with the MTC device, needs to acquire information of an MME or SGSN where a group service that is requested by the MTC server and is corresponding to an service identifier in a service request is located; and when acquiring the information of the MME or SGSN, the second link establishing unit 42 may search for the information locally, or may acquire the information by sending a request to an HSS.

It should be noted that, by using the second request receiving unit 40, the second service session establishing unit 41, and the second link establishing unit 42, a network device establishes a service session of a group service and a link of the group service, and in this way, transmission of uplink and downlink service data may be performed; when the network device receives uplink service data reported by an MTC device, the network device collects related charging statistics according to the established service session, and converges and delivers the uplink service data to the MTC server; and when the network device receives downlink service data sent from the MTC server, the network device delivers the downlink service data to the MTC device through the link with the MTC device.

It can be seen that, in the embodiment of the present invention, an MTC server 600 is directly connected to a network device 400 in a 3GPP network to perform service processing; and in the network device 400, after a second request receiving unit 40 receives a triggering request message, a second service session establishing unit 41 establishes a corresponding service session according to information of a requested group service, and a second link establishing unit 42 establishes a link with an MTC device. Therefore, when an M2M technology is applied to a mobile communication system, that is, an MTC application, an MTC server accesses only the network device 400 in a 3GPP internal network, rather than that each MTC server directly accesses each network element device in the 3GPP internal network, thereby improving the security of a network system of the MTC application.

Figure 10:
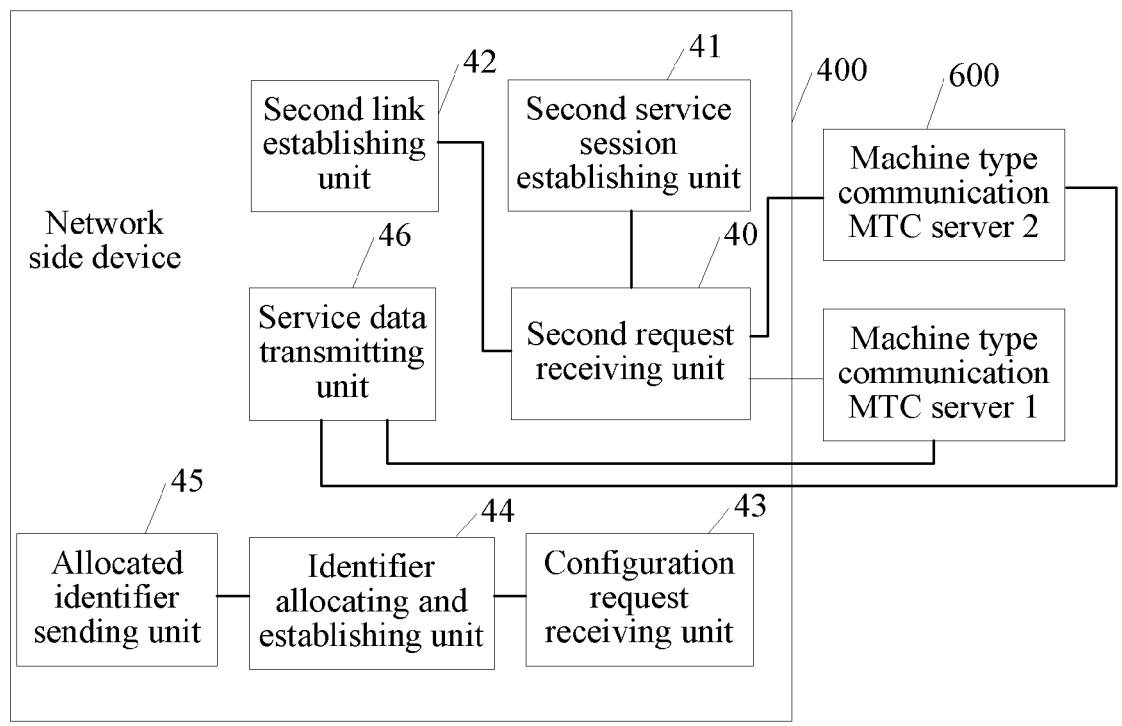
FIG. 10 is a schematic structural diagram of another network device in a service processing system according to another embodiment of the present invention.

Referring to FIG. 10, in a specific embodiment, a network device 400 in this system includes a second request receiving unit 40, a second service session establishing unit 41, a second link establishing unit 42, a configuration request receiving unit 43, an identifier allocating and establishing unit 44, an allocated identifier sending unit 45, and a service data transmitting unit 46.

The configuration request receiving unit 43 is configured to receive a service configuration request message sent from the MTC server 600, where the service configuration request message includes identifier information of the MTC server.

The identifier allocating and establishing unit 44 is configured to acquire subscription information corresponding to the identifier information of the MTC server in the service configuration request message received by the configuration request receiving unit 43, allocate a corresponding service identifier for a service of the MTC server, and establish, according to the subscription information, a context corresponding to the service of the MTC server.

The identifier allocating and establishing unit 44 may be connected to an HSS and may send a request message to the HSS when acquiring the subscription information, so as to request acquiring of the subscription information corresponding to the MTC server; or the identifier allocating and establishing unit 44 may also search a local storage for the subscription information when acquiring the subscription information.

The allocated identifier sending unit 45 is configured to send, to the MTC server, the service identifier allocated by the identifier allocating and establishing unit 44.

The service data transmitting unit 46 is configured to, when receiving uplink service data reported by the MTC device, collect related charging statistics according to an established service session, and converge and deliver the uplink service data to the MTC server 600; and when receiving downlink service data sent from the MTC server 600, deliver the downlink service data to the MTC device through a link with the MTC device.

In the network device 400 in this embodiment, through cooperation of the configuration request receiving unit 43, the identifier allocating and establishing unit 44, and the allocated identifier sending unit 45, information of a service corresponding to the MTC server 600 is configured on the network device 400, so that a procedure of group service processing may be triggered through cooperation of the second request receiving unit 40, the second service session establishing unit 41, and the second link establishing unit 42, and after a session of a group service and a link of the group service are established, the service data transmitting unit 46 may be used to transmit uplink and downlink data of the group service.

It may be understood that, the service processing system in this embodiment of the present invention may further include: an MSMC 500, configured to receive an MTC device triggering request message sent from a machine type communication (MTC) server, where the MTC device triggering request message includes a service identifier corresponding to the MTC server, service information requested for triggering, and an MTC device identifier requested for triggering; acquire, according to the MTC device identifier requested for triggering, information of an MME or SGSN where the MTC device is located, and establish a service session of the service identifier corresponding to the MTC server and a service session of the service information requested for triggering; and send the MTC device triggering request message carrying the MTC device identifier to the MME or SGSN, so that the MME or SGSN establishes a paging link of the MTC device.

Figure 11:
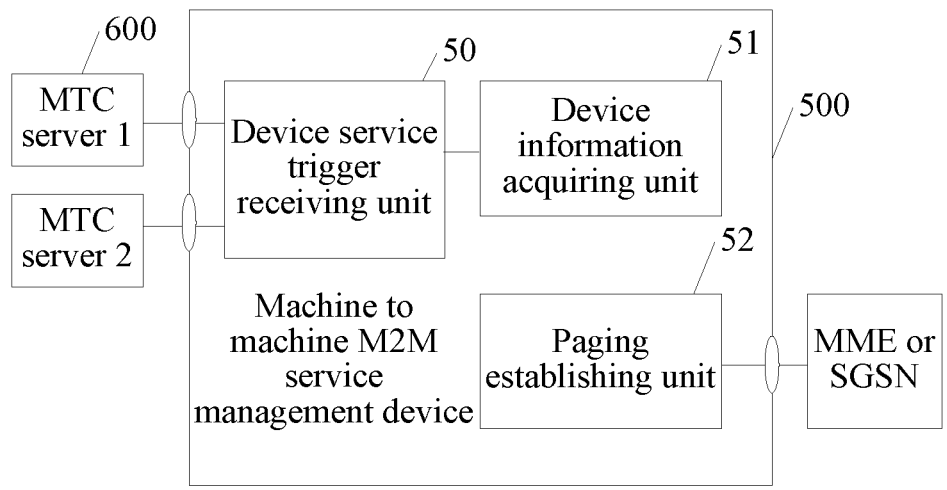
FIG. 11 is a schematic structural diagram of an MSMC in a service processing system according to another embodiment of the present invention.

Specifically, the MSMC 500 in the service processing system according to the embodiment of the present invention is only configured to execute service processing of a single MTC device; and the MSMC 500 is communicated to a network element in a 3GPP network, such as a home subscriber server HSS, an MME or an SGSN, and a schematic structural diagram is shown in FIG. 11, which includes a device trigger receiving unit 50 connected to the MTC server 600, an device information acquiring unit 51, and a paging establishing unit 52.

The device service trigger receiving unit 50 is configured to receive the MTC device triggering request message sent from the machine type communication (MTC) server 600, where the MTC device triggering request message includes the service identifier corresponding to the MTC server, the service information requested for triggering, and the MTC device identifier requested for triggering.

The acquiring and establishing unit 51 is configured to acquire, according to the MTC device identifier requested for triggering, the information of the MME or SGSN where the MTC device is located, and establish the service session of the service identifier corresponding to the MTC server and the service session of the service information requested for triggering.

It may be understood that, the information of the MME or SGSN where the MTC device is located may be stored in an HSS, and may also be stored in the MSMC in this embodiment, so that the device information acquiring unit 51, when acquiring the information of the MME or SGSN, may search a local storage for the information of the MME or SGSN corresponding to an MTC device identifier, or may send a request to a home subscriber server (HSS) for acquiring the information.

The device information acquiring unit 51 sends a location query request message to the HSS, where the location query request message includes the MTC device identifier; and the HSS receives the location query request, acquires the information of the MME or SGSN through query, and returns the information of the MME or SGSN to the device information acquiring unit 51 in the MSMC for receiving.

The paging establishing unit 52 is configured to send the MTC device triggering request message carrying the MTC device identifier to the MME or SGSN, and the MME or SGSN establishes a paging link of the MTC device after the MME or SGSN receives the MTC device triggering request message.

Therefore, after the paging link of the MTC device is established, uplink and downlink service data of the MTC device is transmitted through the paging link; and after the service data is completely transmitted, the paging unit 52 is further configured to release the service session established by the acquiring and establishing unit 51, and send a service release request to the MME or SGSN to request releasing of the paging link of the MTC device, and the MME or SGSN releases the paging link of the MTC device after receiving the service release request.

Figure 12:
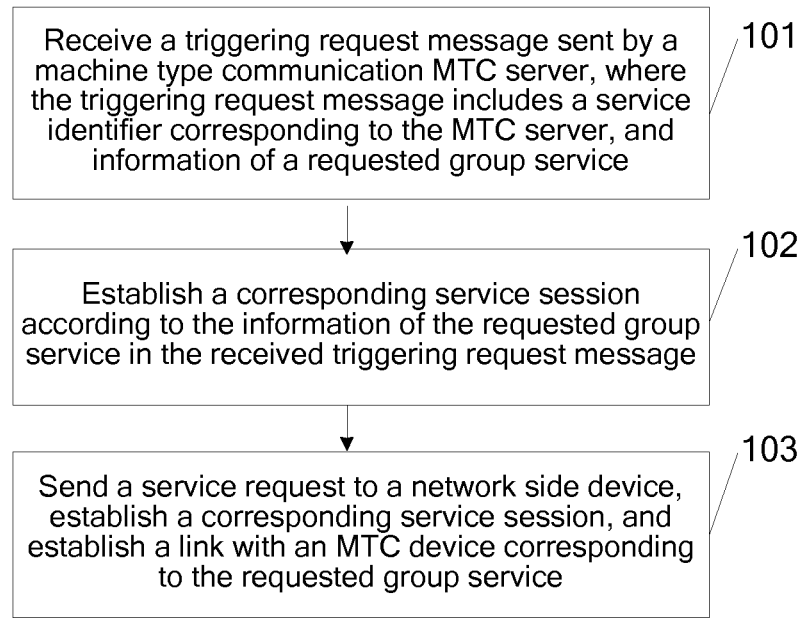
FIG. 12 is a flow chart of a method processing service according to a method embodiment of the present invention.

A method embodiment of the present invention is as follows:

An embodiment of the present invention further provides a method processing service, the method in this embodiment is applicable to the service processing system shown in FIG. 2, and the method in this embodiment is a group method processing service executed by the MSMC shown in FIG. 2; and FIG. 12 is a flow chart of the method in this embodiment, which includes:

101. Receive a triggering request message sent from a machine type communication (MTC) server, where the triggering request message includes a service identifier corresponding to the MTC server and information of a requested group service.

Herein, the service identifier corresponding to the MTC server is allocated by an MSMC for the MTC server in a process of initial configuration of the MSMC, each MTC server is corresponding to one service identifier, each MTC server has a plurality of services, and one type of services corresponding to at least two MTC devices is referred to as a group service; and the information of the requested group service may include: a type of the requested group service, and a feature parameter of the group service such as a period and a delay requirement.

It may be understood that, the sent triggering request message may further include basic information that forms a message, such as a source address and a destination address.

102. Establish a corresponding service session (session) according to the information of the requested group service in the received triggering request message.

When establishing the corresponding service session, necessary data for performing corresponding group service processing, such as a charging initial value, may be generated according to information such as the type of the requested group service and the feature parameter; and a necessary function for performing the group service processing is started, for example, a timer is started. In this way, the corresponding service session is established.

Before the service session is established, the MSMC may search, according to the service identifier included of the triggering request message, for a context corresponding to the MTC server; and determine whether the triggering request is allowable, if the triggering request is allowable, establish the service session, and if the triggering request is unallowable, feedback a response message to the MTC server to notify the MTC server of a triggering request failure.

103. Send a service request to a network device, such as a multimedia broadcast/multicast service BM/SC device, where the service request includes the service identifier and the information of the requested group service.

In this way, after receiving the service request, the network device establishes a corresponding service session according to the service identifier and the information of the requested group service in the service request, and establishes links with at least two MTC devices corresponding to the requested group service.

For example, the network device may first generate, according to information such as the type of the requested group service and the feature parameter, necessary data for performing corresponding group service processing, such as a charging initial value; and start a necessary function for performing the group service processing, for example, start a timer. In this way, the corresponding service session is established.

During establishing a link, the network device may search locally, according to the service identifier in the service request, for information of a mobility management entity (MME) or serving general packet radio service support node (SGSN) where an MTC device corresponding to the requested group service is located, and establish, through the found MME (or SGSN), a link with the MTC device.

It should be noted that, the network device executes the foregoing steps 101 to 103, so that the session corresponding to the requested group service is established, and in this way, service data between the MTC server and the MTC device can be transmitted through the MSMC, that is, when the MSMC receives uplink service data that is reported by the MTC device through the network device, the MSMC collects related charging statistics according to the established service session, and converges and delivers the uplink service data to the MTC server; and when the MSMC receives downlink service data sent from the MTC server, the MSMC delivers the downlink service data to the MTC device through a link with the network device.

For example, when the related charging statistics is collected, group service data may be charged according to information such as a type of a service in the service session, quality of service (QoS) of uplink data transmission, and a charging policy.

It should be noted that, before the group service data is transmitted, a data link needs to be established between the MSMC and the network device and between the MSMC and the MTC server, and the established data link is released after the transmission of the group service data is completed.

It can be seen that, in the embodiment of the present invention, an MSMC is added between an MTC server and a conventional 3GPP network to perform service processing, and during the service processing, after the MSMC receives a triggering request message, the MSMC establishes a corresponding service session according to information of a requested group service, sends a service request to a network device to establish a corresponding service session and establish a link with an MTC device. Therefore, when an M2M technology is applied to a mobile communication system, that is, an MTC application, a comprehensive management device, that is, an MSMC, may be used to access a 3GPP internal network device, rather than that each MTC server directly accesses the 3GPP internal network device, thereby improving the security of a network system of the MTC application.

In a specific embodiment, before executing the foregoing step 103, the MSMC may further acquire information of a mobility management entity (MME) or serving general packet radio service support node (SGSN) where an MTC device corresponding to the requested group service is located; and when executing the foregoing step 103, the MSMC may carry the acquired information of the MME or SGSN in a service request, and send the service request to the network device, so that the network device establishes, through the MME or SGSN, a link with the MTC device corresponding to the requested group service.

It may be understood that, when establishing the link with the MTC device, the network device needs to first acquire the information of the MME or SGSN where the MTC device corresponding to requested group service is located, and the information of the MME or SGSN may be stored in the network device, or may be sent from the MSMC to the network device.

When the information of the MME or SGSN is sent from the MSMC, the MSMC first needs to acquire the information of the MME or SGSN.

If the MSMC stores correspondence between a group service and information of an MME (or SGSN), a local storage is searched for the information of the MME or SGSN corresponding to the requested group service.

If an HSS stores information of an MME (or SGSN), the MSMC may initiate a location query process to the HSS, that is, send a location query request to a home subscriber server (HSS), where the location query request includes the information of the requested group service; request searching for information of a mobility management entity (MME) or serving general packet radio service support node (SGSN) corresponding to the information of the requested group service; and receive the information of the MME or SGSN, where the information of the MME or SGSN is returned by the HSS according to the location query request.

The MSMC may also receive subscription information that is corresponding to the MTC server and is sent from the home subscriber server (HSS), and parse the subscription information to acquire the information of the MME or SGSN.

Figure 13:
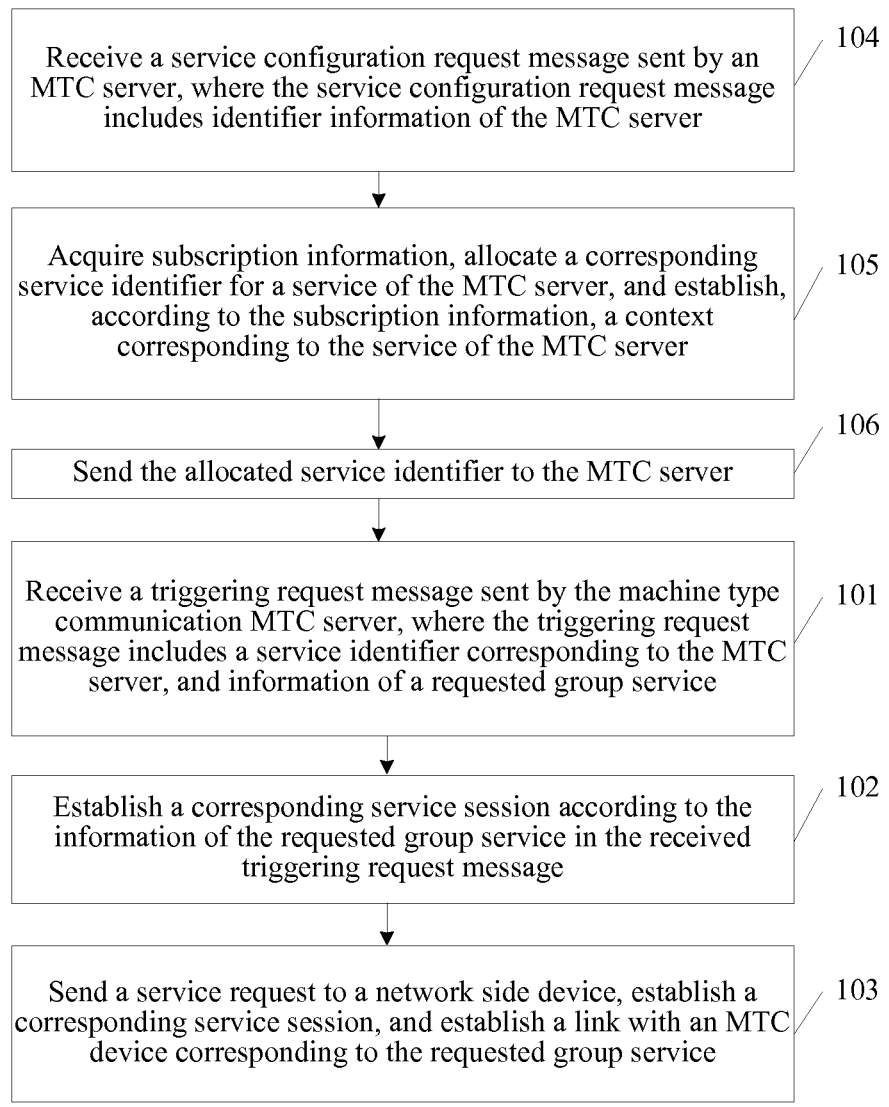
FIG. 13 is a flow chart of another method processing service according to a method embodiment of the present invention.

Referring to FIG. 13, in another specific embodiment, before executing the foregoing group service processing process, that is, before an operation such as establishment of a service session, the MTC server may initiate a service initial configuration process of the MSMC, and the MSMC, before executing the foregoing step 101, may further execute the following steps:

104. Receive a service configuration request message sent from the MTC server, where the service configuration request message includes identifier information of the MTC server.

It may be understood that, the identifier information of the MTC server included in the service configuration request message may be an address identifier of the MTC server, and may also be a device identifier of the MTC server.

105. Acquire subscription information corresponding to the identifier information of the MTC server, allocate a corresponding service identifier for a service of the MTC server, and establish, according to the subscription information, a context corresponding to the service of the MTC server.

The subscription information corresponding to the MTC server may be stored in the HSS or MSMC, and when acquiring the subscription information, the MSMC may search a local storage for the subscription information corresponding to the identifier information of the MTC server; or send a subscription request message to the HSS, where the subscription request message includes the identifier information of the MTC server, and receive the subscription information that is returned by the HSS according to the identifier information of the MTC server. In this case, if the service configuration request message received by the MSMC not only includes the identifier information of the MTC server, but also includes information of a group service requested for configuration, the subscription request message sent to the HSS further includes the information of the group service requested for configuration, and the HSS returns subscription information related to both the identifier information of the MTC server and the information of the group service requested for configuration. For example:

If information included in the service configuration request message indicates that group services requested by an MTC server 1 for configuration are services of a service type 1 and a service type 2, when the subscription request message sent from the MSMC to the HSS includes information indicating the services of the service type 1 and the service type 2 requested for configuration, the subscription information returned by the HSS is subscription information related to the services of the service type 1 and the service type 2 in the MTC server 1. Because one MTC server has a plurality of services, in this embodiment, the HSS may be requested, according to an actual requirement, to acquire subscription information requested for configuration, instead of being requested to acquire all subscription information corresponding to the MTC server 1, thereby reducing transmission signaling between the MSMC and the HSS and saving a signaling resource.

It should be noted that, if the identifier information of the MTC server included in the service configuration request message received by the MSMC is non-3GPP protocol identifier information, that is, 3GPP external identifier information, first it needs to map the identifier information of the MTC server into 3GPP internal identifier information, that is, 3GPP protocol identifier information, and then the corresponding subscription information is acquired; and the MSMC specifically stores the acquired subscription information when establishing the context.

106. Send the allocated service identifier to the MTC server, for example, the MSMC may carry the allocated service identifier in a service configuration response message and send the service configuration response message to the MTC server.

The foregoing steps 104 to 106 executed by the MSMC are only configuration of a group service in the MTC server during initial group service processing, and it may not need to configure every time during subsequent processing of the group service corresponding to the MTC server.

Particularly, when the group service requested by the service configuration request message for configuration is periodic triggering service and/or a monitoring service; and at the same time when acquiring the subscription information, allocating the service identifier and establishing the context, the MSMC establishes a corresponding service session according to information of the periodic triggering service and/or monitoring service requested for configuration, and sends a periodic triggering and/or monitoring service request to the network device, where the periodic triggering and/or monitoring service request includes a service identifier and information of a requested periodic triggering and/or monitoring service, so that the network device establishes a corresponding service session according to the service identifier and the information of the requested periodic triggering and/or monitoring service, and establishes a link with an MTC device corresponding to the requested periodic triggering and/or monitoring service.

It can be seen that, in this embodiment, an MTC server may be used to send a triggering request message to trigger a procedure of group service processing, that is, when receiving the triggering request message, an MSMC establishes a service session and sends a service request; and for a periodic triggering service or a monitoring service, in a process of initial configuration of the MSMC, the procedure of the group service processing may be triggered according to acquired subscription information, that is, when acquiring the subscription information, the MSMC establishes the service session and sends the service request.

Figure 14:
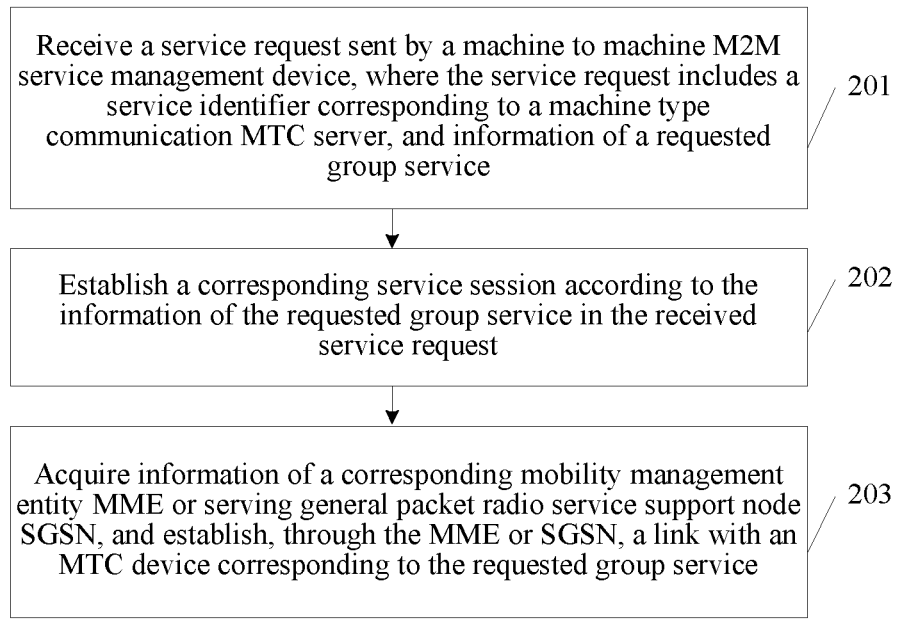
FIG. 14 is a flow chart of a method processing service according to another method embodiment of the present invention.

Another method embodiment of the present invention is as follows:

An embodiment of the present invention further provides a method processing service, the method in this embodiment is applicable to the service processing system shown in FIG. 2, and this embodiment is a group method processing service executed by the network device shown in FIG. 2; and FIG. 14 is a flow chart of the method in this embodiment, which includes:

201. Receive a service request sent from a machine to machine (M2M) service management device, where the service request includes a service identifier corresponding to a machine type communication (MTC) server and information of a requested group service.

It may be understood that, herein the service identifier corresponding to the MTC server is a service identifier allocated by an MSCS for a service of the MTC server in a process of initial configuration performed by the MTC server on the MSMC.

202. Establish a corresponding service session according to the information of the requested group service in the received service request.

After establishing the service session, the network device stores the service session and the service identifier in the service request in a correspondence manner.

203. Acquire information of a corresponding mobility management entity (MME) or serving general packet radio service support node (SGSN) according to the service identifier and the information of the requested group service in the received service request, and establish, through the MME or SGSN, a link with an MTC device corresponding to the requested group service.

The network device, before establishing the link with the MTC device, needs to acquire information of an MME or SGSN where the requested group service corresponding to the service identifier in the service request is located; and when acquiring the information of the MME or SGSN, the network device may search for the information locally, may acquire the information by sending a request to an HSS, or may receive the information sent from the MSMC.

It can be seen that, in the embodiment of the present invention, an MSMC is added between an MTC server and a 3GPP network to perform service processing, and during the service processing, the MSMC sends a service request to a network device in the 3GPP network, so that after receiving a triggering request message, the network device establishes a corresponding service session according to information of a requested group service, and establishes a link with an MTC device. Therefore, when an M2M technology is applied to a mobile communication system, that is, an MTC application, a comprehensive management device MSMC may be used to access a 3GPP internal network device, rather than that each MTC server directly accesses the 3GPP internal network device, thereby improving the security of a network system of the MTC application.

Figure 15:
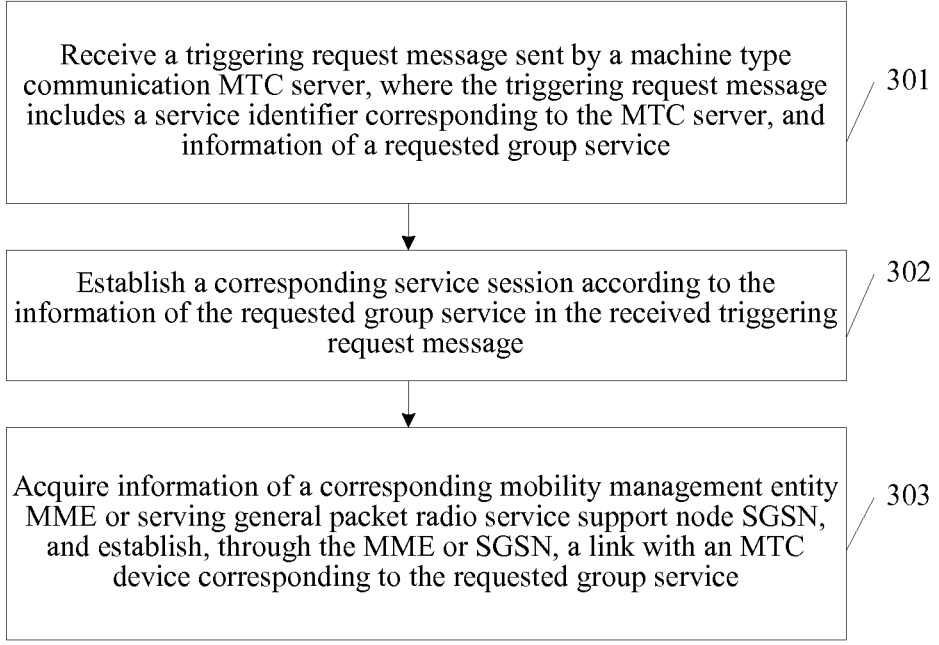
FIG. 15 is a flow chart of a method processing service according to still another method embodiment of the present invention.

Method embodiment 3 of the present invention is as follows:

An embodiment of the present invention further provides a method processing service, the method in this embodiment is applicable to the service processing system shown in FIG. 8, and this embodiment is a group method processing service executed by the network device shown in FIG. 8, where the network device is directly connected to an MTC server to perform group service processing; and FIG. 15 is a flow chart of the method in this embodiment, which includes:

301. Receive a triggering request message sent from a machine type communication (MTC) server, where the triggering request message includes a service identifier corresponding to the MTC server and information of a requested group service.

It may be understood that, herein the service identifier corresponding to the MTC server is a service identifier allocated by the network device for a service of the MTC server in a process of initial configuration performed by the MTC server on a BM/SC device.

302. Establish a corresponding service session according to the information of the requested group service in the received triggering request message.

After establishing the service session, the network device stores the service session and the service identifier of the triggering request message in a correspondence manner.

303. Acquire information of a corresponding mobility management entity (MME) or serving general packet radio service support node (SGSN) according to the service identifier and the information of the requested group service in the received triggering request message, and establish, through the MME or SGSN, a link with an MTC device corresponding to the requested group service.

The network device, before establishing the link with the MTC device, needs to acquire information of an MME or SGSN where a group service that is requested by the MTC server and is corresponding to the service identifier in the service request is located; and when acquiring the information of the MME or SGSN, the network device may search for the information locally, or may acquire the information by sending a request to an HSS.

It should be noted that, after the service session and the link are established, transmission of uplink and downlink service data may be performed; when the network device receives uplink service data reported by the MTC device, the network device collects related charging statistics according to the established service session, and converges and delivers the uplink service data to the MTC server; and when the network device receives downlink service data sent from the MTC server, the network device delivers the downlink service data to the MTC device through the link with the MTC device.

For example, when the related charging statistics is collected, group service data may be charged according to information such as a type of a service in the service session, quality of service (QoS) of uplink data transmission, and a charging policy.

It can be seen that, in the embodiment of the present invention, an MTC server is directly connected to a network device in a 3GPP network to perform service processing, and after the network device receives a triggering request message, the network device establishes a corresponding service session according to information of a requested group service, and establishes a link with an MTC device. Therefore, when an M2M technology is applied to a mobile communication system, that is, an MTC application, an MTC server accesses only the network device in a 3GPP internal network, rather than that each MTC server directly accesses each network element device in the 3GPP internal network, thereby improving the security of a network system of the MTC application.

In another specific embodiment, before the network device executes the foregoing group service processing process, that is, before an operation such as establishment of a service session, the MTC server may initiate a service initial configuration process of the network device; and for the network device, the process of performing the service initial configuration is similar to a process of service initial configuration performed by the MSMC shown in FIG. 13, that is, before executing the foregoing step 301, the network device may further execute the following steps:

The network device receives a service configuration request message sent from the MTC server, where the service configuration request message includes identifier information of the MTC server; acquires subscription information corresponding to the identifier information of the MTC server, allocates a corresponding service identifier for a service of the MTC server, and establishes, according to the subscription information, a context corresponding to the service of the MTC server; and finally sends the allocated service identifier to the MTC server.

The subscription information corresponding to the MTC server may be stored in the HSS or the network device, and when acquiring the subscription information, the network device may search a local storage for the subscription information corresponding to the identifier information of the MTC server; or may acquire the subscription information by sending a request to the HSS.

The step of the service initial configuration executed by the network device is only configuration of a group service in the MTC server, which is performed when initially performing group service processing, and it may not need to configure every time during subsequent processing of the group service corresponding to the MTC server.

Figure 16:
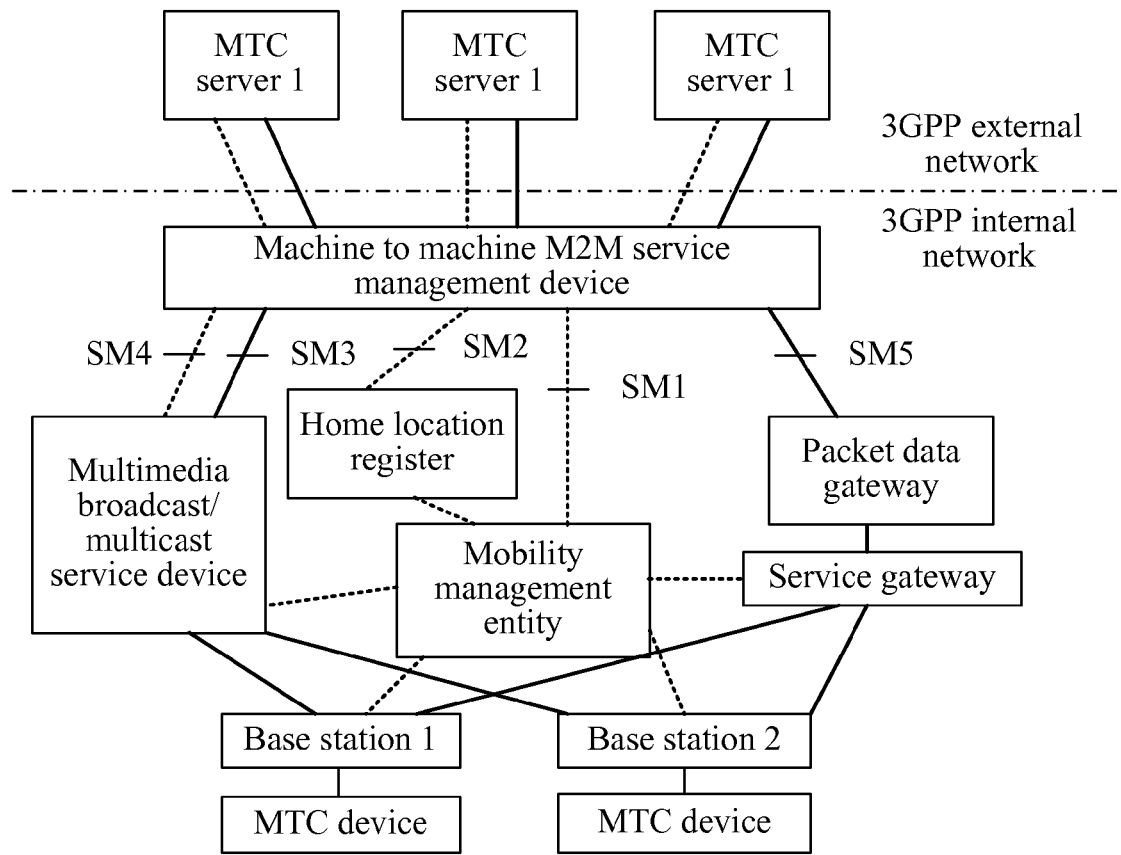
FIG. 16 is a schematic structural diagram of a service processing system according to a specific application embodiment of the present invention.

That an M2M is applied to a long term evolution (LTE) network system is taken as an example for description in the following, and referring to FIG. 16, in a service processing system in this embodiment, a plurality of MTC servers are connected to an MSMC, and communicate with a network element in a 3GPP internal network through the MSMC; the MSMC is communicated to a BM/SC device in the 3GPP internal network, that is, the network device described in the foregoing embodiment, through an SM4 interface and an SM3 interface, is communicated to a home subscriber server, that is, an HSS, through an SM2 interface, is communicated to a mobility management entity, that is, an MME, through an SM1 interface, and is communicated to a packet data gateway (P-GW) through an SM5 interface, where the 3GPP internal network further includes other basic communication network elements such as a base station and a service gateway (S-GW); and an MTC device may access an MSMC in a 3GPP network through the base station and transmits service data with an MTC server.

Figure 17:
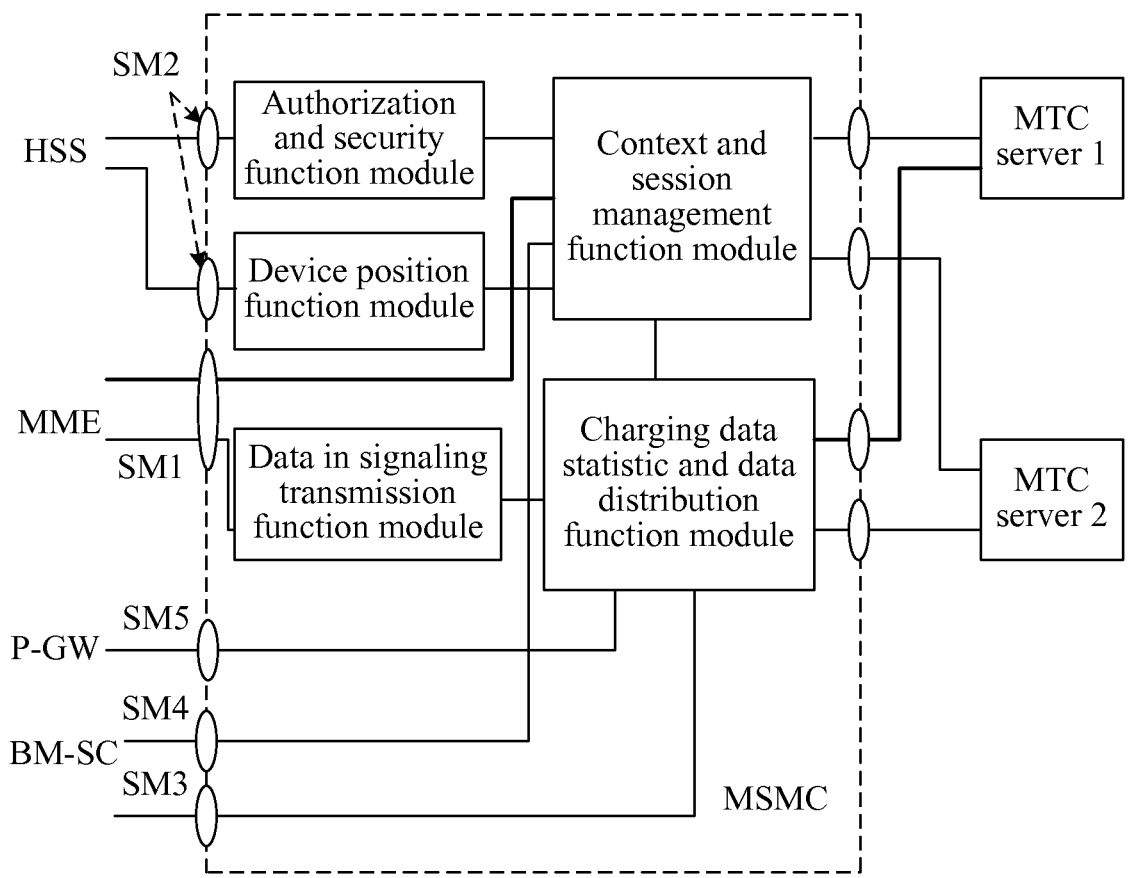
FIG. 17 is a schematic structural diagram of an MSMC in a service processing system according to a specific application embodiment of the present invention.

Referring to FIG. 17, in a specific embodiment, the MSMC includes: an authorization and security function (Authorization and Security Function, referred to as ASF) module, a device position function (Device Position Function, referred to as DPF) module, a data in signaling transmission function (Data in Signaling Transmission Function, referred to as DSTF) module, a charging data statistic and data distribution function (Charging data Statistic and data Distribution Function, referred to as CSDF) module, and a context and session management function (Context and Session Management Function, referred to as CSMF) module.

The ASF module is communicated to an HSS through an SM2 interface, and is responsible for interacting, with an HSS, subscription and configuration information, including security-related information; the DPF module is communicated to the HSS through the SM2 interface, and is responsible for querying the HSS for location information of a single device MME; and the DSTF module is communicated to the MME through an SM1 interface, and is configured to convert a format required by mapping from data to signaling.

The CSDF module is communicated to a plurality of MTC servers, connected to a PGW through an SM5 interface, and connected to a BM/SC device through an SM3 interface; and is configured to recombine and deliver data and a report acquired from uplink to different MTC servers, and map downlink data to different interfaces according to a context and session information.

The CSMF module is communicated to the plurality of MTC servers, connected to the MME through the SM1, and connected to the BM/SC device through an SM4; and is configured to perform, according to subscription information acquired from the HSS, context maintenance, including identifier mapping, perform session maintenance according to requirements of the MTC servers, and determine an adopted grouping policy (service Id) for a member subscribed to a transmission mode, and addition, deletion and attribute modification of a group member of each group, where grouping may be performed according to a geographic location, a subscribed company, a multicast address, and an attribute level of a terminal, and perform various charging according to a requirement of an operator, where the various charging may be related to the context.

Service processing may be performed through the following processes in this embodiment.

Figure 18A:
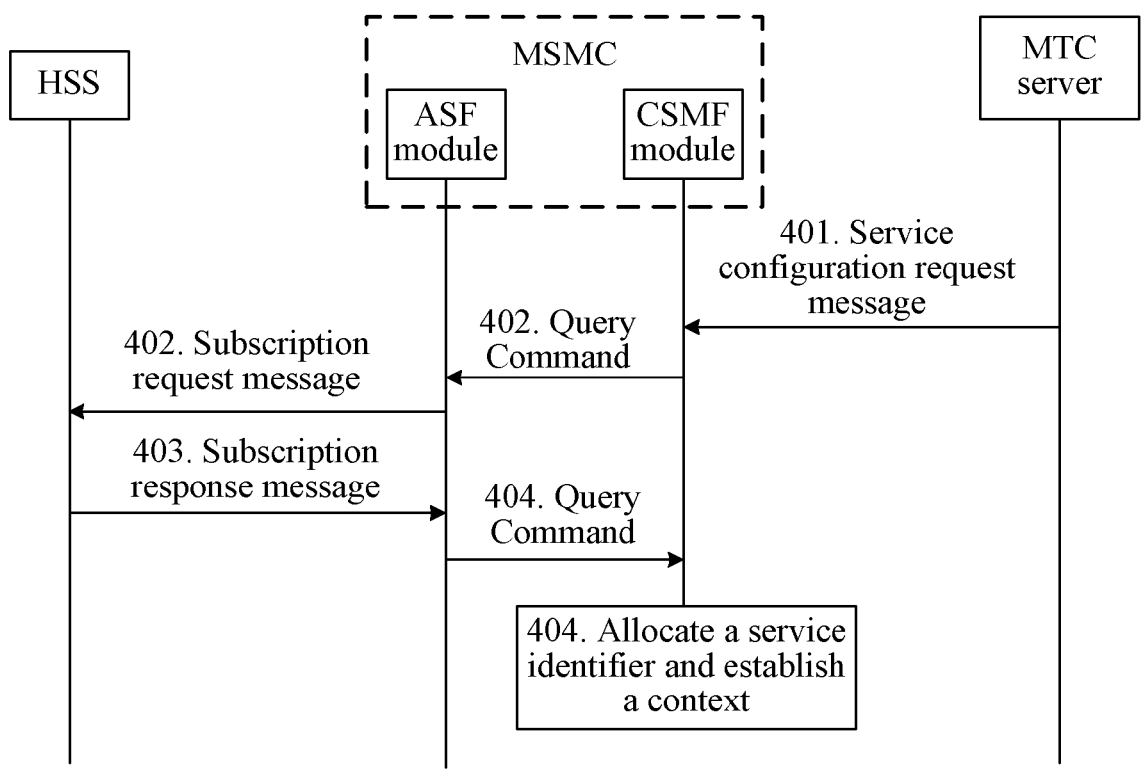
FIG. 18a is a flow chart of a method for performing initial configuration in a service processing system according to a specific application embodiment of the present invention.

Referring to FIG. 18a, when initial configuration is performed:

401. An MTC server sends a service configuration request (Service configuration Request) message to an MSMC, where the service configuration request message carries content such as an address or identifier of the MTC server and feature information of a requested group service.

402. A CSMF module in the MSMC, after receiving the service configuration request message, performs domain name system (DNS) mapping, that is, maps a 3GPP external address or identifier of the MTC server into a 3GPP protocol internal address, and sends a query command to an ASF module so as to request querying of subscription information.

The ASF module, after receiving the query command, sends a subscription request (Subscription Info Request) message to an HSS, where the subscription request message carries an address or identifier of the MTC server, which can be identified by the HSS, so as to request subscription information corresponding to the MTC server.

403. The HSS, after receiving the subscription request message, performs authentication according to the address or identifier of the MTC server in the subscription request message; and determine whether the request is allowable, if the request is allowable, carry subscription information of the MTC server and an operator in a subscription response (subscription Info RESPONSE) message, and if the request is unallowable, indicate, in a subscription response message, that the MTC server is an unauthorized user.

404. The ASF module of the MSMC, after receiving the subscription response message, notifies the CSMF module of a query result of the HSS through the query command; if the subscription response message includes the subscription information, the CSMF module allocates a corresponding service identifier for the MTC server, and establishes a context; and if the subscription response message indicates that the MTC server is an unauthorized user, the CSMF module sends a service configuration response message to the MTC server, and notifies a configuration request failure.

It may be understood that, if a group service requested for configuration in the service configuration request is some periodic triggering services or monitoring services, the CSMF module further needs to establish a corresponding session according to the subscription information, for example, starts a related timer, and sends the service configuration response message to the MTC server, where the service configuration response message carries the allocated service identifier; and particularly, for a monitoring service, the CSMF module further needs to send a control message to the MME to start a monitoring function.

Figure 18B:
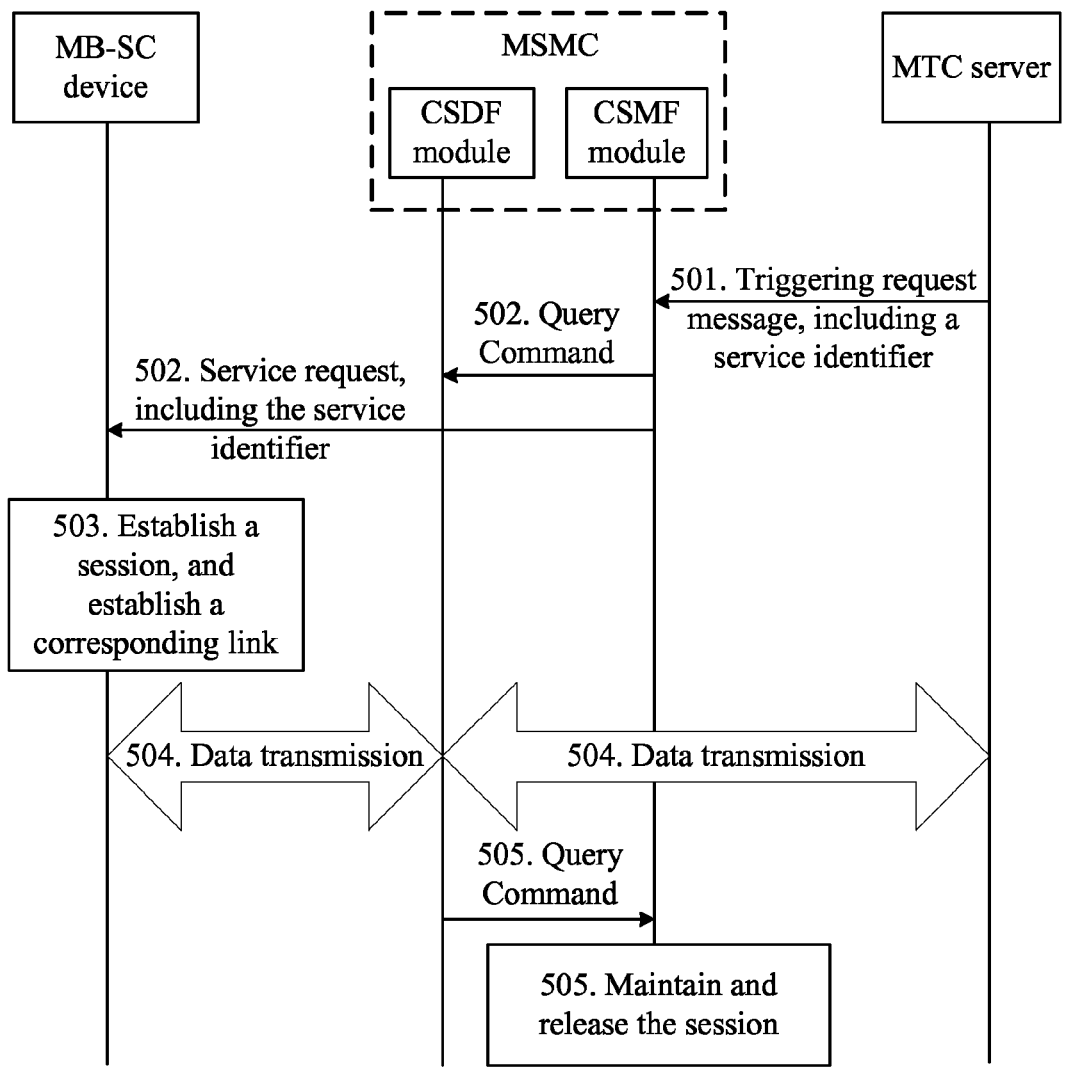
FIG. 18b is a flow chart of a method for performing group service processing in a service processing system according to a specific application embodiment of the present invention.

Referring to FIG. 18b, when group service processing is performed:

501. An MTC server sends a triggering request message to an MSMC, where the triggering request message carries a service identifier corresponding to the MTC server, a type of a requested group service, and a feature parameter of the group service, such as a period and a delay requirement.

502. A CSMF module in the MSMC, after receiving the triggering request message, searches, based on the service identifier of the triggering request message, for a context, so as to determine whether the request is allowable, and if the request is allowable, the CSMF module establishes a service session of the group service, and sends a service request to a BM-SC device, where the service request carries feature parameters of a server and a group service request; and the CSMF module further needs to send a query command to a CSDF module to notify established session information, and the CSDF module performs, based on the session information, data integration.

It may be understood that, if it is determined that the triggering request is unallowable, the CSMF module directly feeds back a triggering response message to the MTC server to notify a request failure, and the procedure ends.

503. The BM-SC device, after receiving the service request, feeds back a service response message, establishes a service session corresponding to the requested group service, acquires information of an MME where the requested group service is located, and the MME establishes a link with an MTC device corresponding to the requested group service.

It may be understood that, the information of the MME may be stored in the BM-SC device, and may also be provided by the MSMC.

504. Perform data transmission. On the uplink, the MTC device reports uplink service data to the BM-SC device, the BM-SC device forwards the uplink service data to the CSDF module in the MSMC, and the CSDF module collects, based on the established service session, related charging statistics, and converges and delivers the uplink service data to the MTC server. On the downlink, the CSDF module, after completing establishment of a link with the BM-SC device, delivers downlink service data to the MTC device through the BM-SC device.

505. The CSDF module, after completing forwarding of the uplink/downlink service data, sends a query command to the CSMF module to indicate that a service is completed, where the query command may include the service identifier corresponding to the MTC server, and charging data statistical information; and the CSMF module, after receiving the query command, performs maintenance on a context corresponding to the service identifier, and releases the corresponding session.

Figure 18C:
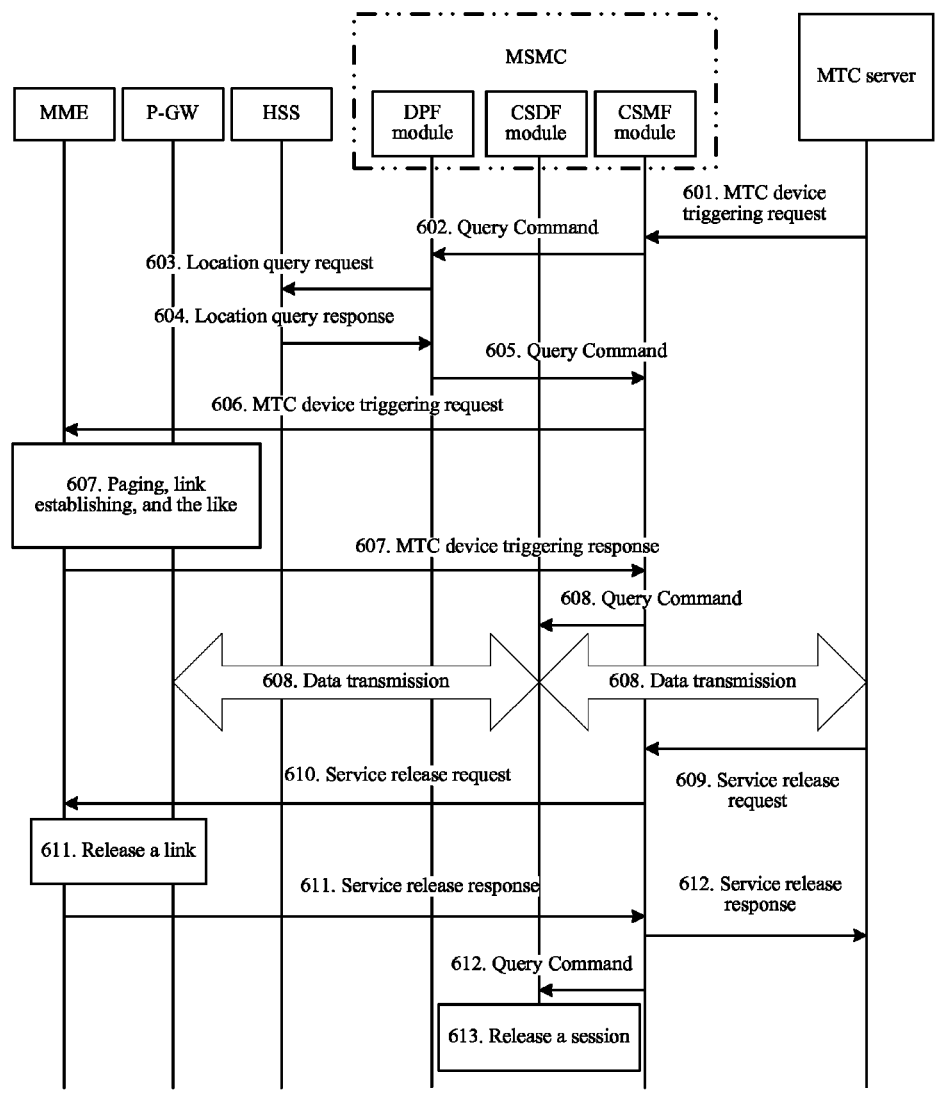
FIG. 18c is a flow chart of a method for performing service processing of a single MTC device in a service processing system according to a specific application embodiment of the present invention.

Referring to FIG. 18c, when service processing of a single MTC device is performed:

601. An MTC server sends an MTC device triggering request (triggering Request) message to an MSMC, where the MTC device triggering request message carries a service identifier, a type of a requested group service, and an MTC device identifier.

602. After receiving triggering request message, a CSMF module of the MSMC searches, based on the service identifier, for a context, and determines whether the request is allowable, if the request is unallowable or the MTC device ID is unallowable, directly feeds back an MTC device triggering response message to the MTC server to notify a request failure, and the procedure ends; if the request is allowable, the CSMF module performs identifier mapping conversion on the MTC device identifier, and after acquiring a 3GPP internal address corresponding to the MTC device identifier, establishes a service session corresponding to the MTC device and the requested group service, and feeds back an MTC device triggering response message to the MTC server; and the CSMF module further needs to send a query command to a DPF module to request querying of a location.

603. The DPF module in the MSMC sends a location query request to an HSS, where the location query request carries an internal address of the MTC device, so as to request querying of information of an MME corresponding to the MTC device.

604. The HSS, after receiving the location query request, searches, based on the internal address of the MTC device, for the information of the corresponding MME, carries the information of the MME in a location query response, and sends the location query response to the MSMC.

605. The DPF module in the MSMC, after receiving the location query response, notifies the CSMF module of the information of the corresponding MME through the query command, and if the information of the MME fails to be acquired, the CSMF module feeds back a response message to the MTC server to notify the failure, and the procedure ends.

606. The CSMF module sends, based on the information of the MME, an MTC device triggering request message to the corresponding MME, where the MTC device triggering request message carries the internal address of the MTC device.

607. The MME, after receiving the MTC device triggering request message, performs corresponding procedures such as paging and link establishment, and then the MME sends an MTC device triggering response message to the MSMC.

608. The CSMF module in the MSMC, after receiving the MTC device triggering response message, sends a query command to a CSDF module, and the CSDF module starts performing data interaction with a P-GW and the MTC server.

609. The MTC server determines that data transmission is completed, and sends a service release request (Service Release Request) message to the MSMC, so as to request releasing of a service.

610. The MSMC, after receiving the service release request message, sends an MTC device triggering request message to the MME to indicate releasing of the service.

611. The MME, after receiving the service release request message, performs a process such as link releasing, and then feeds back a service release response message to the MSMC.

612. The CSMF module of the MSMC, after receiving the service release response message, feeds back a release response message to the MTC server, and sends a query command to the CSDF module, so as to request releasing of a corresponding service session.

613. The CSDF module, after receiving the query command, if charging statistical data information exists, notifies the CSMF module through the query command, and releases the corresponding service session.

Figure 19:
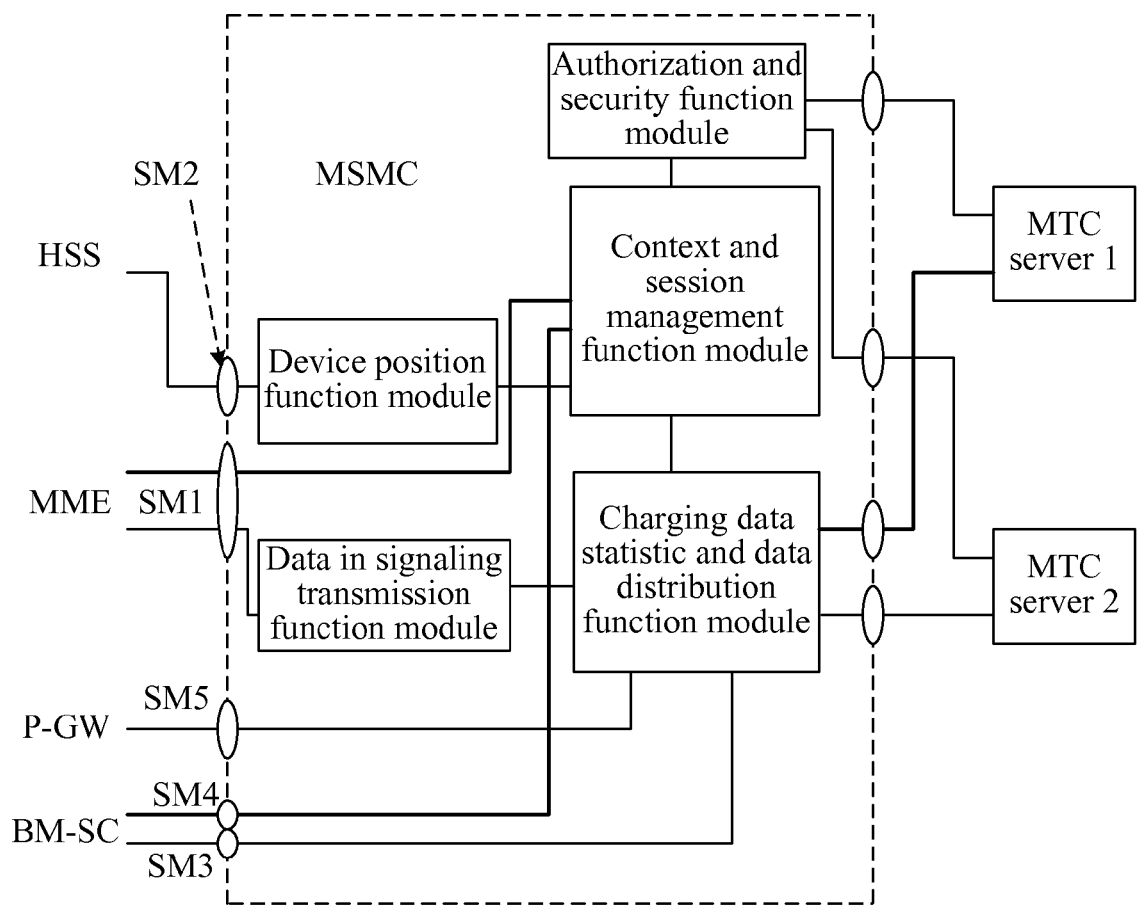
FIG. 19 is a schematic structural diagram of another MSMC in a service processing system according to a specific application embodiment of the present invention.

Referring to FIG. 19, in another specific application embodiment, a structure of an MSMC is similar to a structure of the MSMC shown in FIG. 17, and a difference lies in an ASF module; and an ASF module in the MSMC in this embodiment is not connected to an HSS through an SM2 interface, but is communicated to an MTC server.

The ASF module in this embodiment is not interacted with the HSS, and is configured to store information related to the MTC server, such as subscription information and security, and the subscription information and security information are directly sent from the MTC server to the ASF module. In the foregoing initial configuration process, the ASF module, after receiving a query command for requesting querying of the subscription information, where the query command is sent from a CSMF module, acquires the subscription information by searching the ASF module, and returns the subscription information to the CSMF module through the query command.

Figure 20:
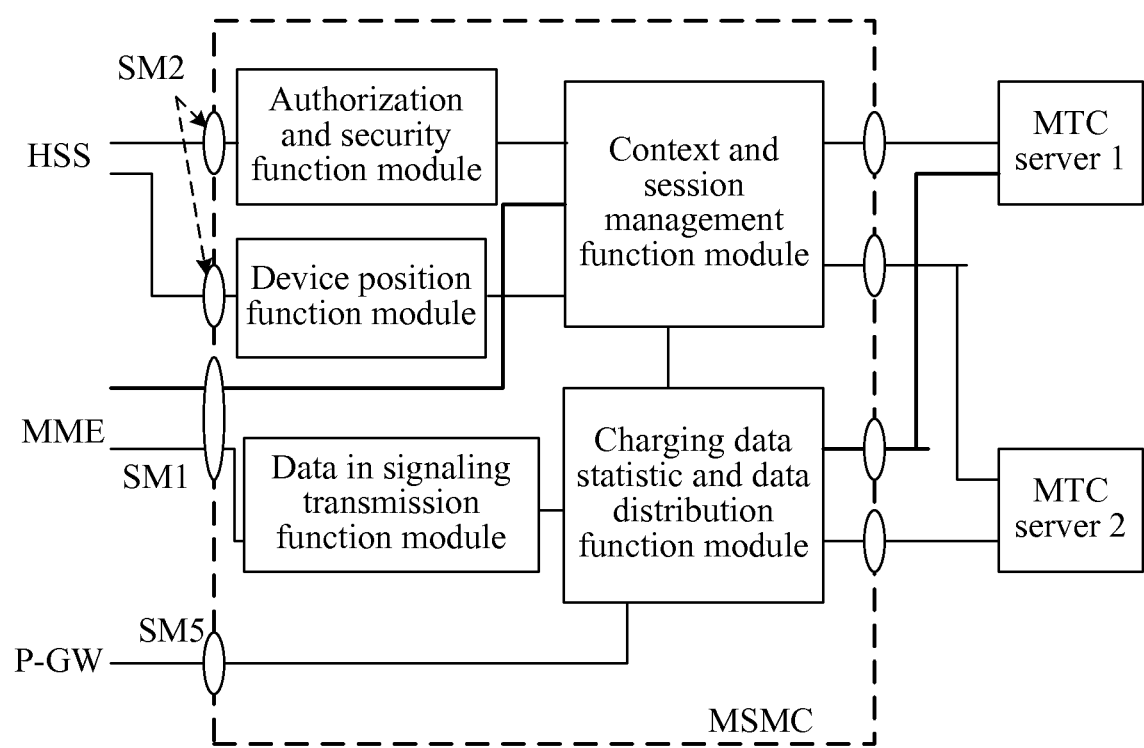
FIG. 20 is a schematic structural diagram of an MSMC in a service processing system according to another specific application embodiment of the present invention.

That another M2M is applied to a long term evolution (LTE) network system is taken as an example for description in the following, and referring to FIG. 20, in a service processing system in this embodiment, a plurality of MTC servers are directly connected to a BM-SC device, so as to directly perform group service processing with the BM-SC device; and an MSMC is communicated to the plurality of MTC servers, a connection between the MSMC and a network element in a 3GPP internal network is similar to a connection between the MSMC and the network element in the 3GPP internal network shown in FIG. 16, which is not described herein again, and a difference lies in that the MSMC in this embodiment is not connected to the BM-SC device.

A structure of the MSMC in this embodiment is similar to the structure shown in FIG. 17, and a difference lies in that the MSMC in this embodiment does not have SM3 and SM4 interfaces. In this embodiment, the BM-SC device interacts with an MTC server, and when the BM-SC device performs initial configuration and group service processing, a specific process is similar to a procedure of initial configuration and group service processing performed by the MSMC, and a process that the MSMC in this embodiment performs a service of a single MTC device is the same as a process shown in FIG. 18c, which is not described herein again.

Persons of ordinary skill in the art may understand that all or a part of the steps of the methods according to the foregoing embodiments may be implemented by a program instructing relevant hardware, the program may be stored in a computer readable storage medium, and the storage medium may include a read only memory (ROM), a random access memory (RAM), a magnetic disk, or an optical disk.

The machine to machine service management device, the network device, the method processing service and system provided in the embodiments of the present invention are described in detail in the foregoing, and a principle and an implementation manner of the present invention are described in this specification through specific examples. The description about the foregoing embodiments is merely provided for helping understand the method and core ideas of the present invention. Meanwhile, persons of ordinary skill in the art may make variations and modifications to the specific implementation manner and application scope according to the ideas of the present invention. In conclusion, content of the specification shall not be construed as a limitation to the present invention.

What is claimed is:

1. A machine to machine (M2M) service management device for managing communication between a machine type communication (MTC) server and a network device, comprising:
    a receiver, configured to receive a triggering request message sent from the MTC server, wherein the triggering request message comprises a service identifier corresponding to the MTC server assigned by the M2M service management device and information of a requested group service;
    a processor, configured to establish a first service session associated with the MTC server according to the information of the requested group service; and
    a transmitter configured to send a service request to the a network device, wherein the service request comprises the service identifier and the information of the requested group service to the network device to establish a second service session with the M2M service management device, and links with at least two MTC devices corresponding to the requested group service.

2. The device according to claim 1, wherein,
    the processor is further configured to acquire information of a mobility management entity (MME) or serving general packet radio service support node (SGSN) where an MTC device corresponding to the information of the requested group service is located, and
    the service request further comprises the information of the MME or SGSN for the network device to establish, through the corresponding MME or SGSN, a link with the MTC device.

3. The device according to claim 2, wherein, the processor is further configured to search a local storage for the information of the MME or SGSN where the MTC device corresponding to the information of the requested group service is located.

4. The device according to claim 2, wherein,
    the transmitter is further configured to send a location query request to a home subscriber server (HSS), wherein the location query request comprises the information of the requested group service, in order to request searching for the information of the MME or SGSN corresponding to the information of the requested group service; and
    the receiver is further configured to receive the information of the MME or SGSN, wherein the information of the MME or SGSN is returned by the HSS according to the location query request.

5. The device according to claim 2, wherein,
    the receiver is further configured to receive subscription information that is corresponding to the MTC server and is sent from the home subscriber server (HSS); and
    the processor is further configured to parse the subscription information to acquire the information of the MME or SGSN.

6. The device according to claim 1, wherein,
    the receiver is further configured to receive a service configuration request message sent from the MTC server, wherein the service configuration request message comprises identifier information of the MTC server;
    the processor is further configured to acquire subscription information corresponding to the identifier information of the MTC server, allocate a corresponding service identifier for a service of the MTC server, and establish, according to the subscription information, a context corresponding to the service of the MTC server; and
    the transmitter is further configured to send the allocated service identifier to the MTC server.

7. The device according to claim 6, wherein the processor is further configured to search a local storage for the subscription information corresponding to the identifier information of the MTC server.

8. The device according to claim 6, wherein the transmitter is further configured to send a subscription request message to a home subscriber server (HSS), wherein the subscription request message comprises the identifier information of the MTC server.

9. The device according to claim 6, wherein the receiver is further configured to receive the subscription information that is returned by the HSS according to the identifier information of the MTC server.

10. The device according to claim 6, wherein,
    the service configuration request message further comprises at least one of periodic triggering service information and monitoring service information requested for configuration;
    the processor is further configured to establish a corresponding service session according to at least one of the periodic triggering service information and monitoring service information requested for configuration; and
    the transmitter is further configured to send at least one of a periodic triggering and monitoring service request to the network device, wherein the at least one of the periodic triggering and monitoring service request comprises the service identifier and information of at least one of a requested periodic triggering and monitoring service, so that the network device establishes a corresponding service session according to the service identifier and the information of the at least one of the requested periodic triggering and monitoring service, and establishes links with at least two MTC devices corresponding to the at least one of the requested periodic triggering and monitoring service.

11. The device according to claim 1, wherein,
    the processor is further configured to collect related charging statistics according to the established service session and converge and deliver the uplink service data to the MTC server if the receiver receives uplink service data that is reported by the MTC device through the network device; and
    the processor is further configured to deliver the downlink service data to the MTC device through a link with the network device if the receiver receives downlink service data sent from the MTC server.

12. The device according to claim 1, wherein,
the triggering request message is an MTC device triggering request message, and the MTC device triggering request message further comprises an MTC device identifier requested for triggering;
the processor is further configured to establish a service session of the information of the requested group service and a service session corresponding to the MTC device identifier;
the transmitter is further configured to send a location query request message to the home subscriber server (HSS), wherein the location query request message comprises the MTC device identifier; and
the transmitter is further configured to send an MTC device triggering request message carrying the MTC device identifier to the MME or SGSN if the receiver receives the information of the MME or SGSN, wherein the information of the MME or SGSN is returned by the HSS according to the MTC device identifier, so that the MME or SGSN establishes a paging link of the MTC device.

13. A network device comprising:
a receiver, configured to receive a service request sent from a machine to machine (M2M) service management device, wherein the service request comprises a service identifier corresponding to the a machine type communication (MTC) server assigned by the M2M service management device and information of a requested group service;
a processor, configured to establish a service session with the M2M service management device according to the information of the requested group service; and configured to acquire information of a corresponding mobility management entity (MME) or serving general packet radio service support node (SGSN) according to the service identifier and the information of the requested group service; and
a processor, configured to establish a link with an MTC device corresponding to the requested group service through the MME or SGSN.

14. A network device comprising:
a receiver, configured to receive a triggering request message sent from a machine type communication (MTC) server, wherein the triggering request message comprises a service identifier corresponding to a machine type communication (MTC) server and information of a requested group service;
a processor, configured to establish a service session according to the information of the requested group service; acquire information of a corresponding mobility management entity (MME) or serving general packet radio service support node (SGSN) according to the service identifier and the information of the requested group service; and establish a link with an MTC device corresponding to the requested group service through the MME or SGSN.

15. The device according to claim 14, wherein,
the receiver is further configured to receive a service configuration request message sent from the MTC server, wherein the service configuration request message comprises identifier information of the MTC server;
the processor is further configured to acquire subscription information corresponding to the identifier information of the MTC server, allocate a corresponding service identifier for a service of the MTC server, and establish a context corresponding to the service of the MTC server according to the subscription information; and
the device further comprises a transmitter configured to send the allocated service identifier to the MTC server.

16. The device according to claim 14, wherein,
the processor is further configured to collect related charging statistics according to the established service session and converge and deliver the uplink service data to the MTC server if the receiver receives uplink service data that is reported by the MTC device; and
the processor is further configured to deliver the downlink service data to the MTC device through a link with the MTC device if the receiver receives downlink service data sent from the MTC server.

17. A machine to machine (M2M) service management device, for managing a communication between a machine type communication (MTC) server and a mobility management entity (MME) or serving general packet radio service support node (SGSN), comprising:
a receiver, configured to receive the an MTC device triggering request message sent from the MTC server, wherein the MTC device triggering request message comprises a service identifier corresponding to the MTC server assigned by the M2M service management device, service information requested for triggering, and an MTC device identifier requested for triggering;
a processor, configured to acquire, according to the MTC device identifier requested for triggering, information of the MME or the SGSN where the MTC device is located, and establish a service session of the service identifier and the service information requested for triggering; and
a transmitter, configured to send the MTC device identifier to the MME or SGSN to establish a paging link of the MTC device.

18. The device according to claim 17, wherein the processor is further configured to release the service session established by the acquiring and establishing unit after service data transmission is completed, and the transmitter is further configured to send a service release request to the MME or SGSN to request releasing of the paging link of the MTC device.

19. A service processing system, comprising:
at least one machine type communication (MTC) server, a network device and a machine to machine service management device (MSMC) for managing a communication between the MTC server and the network device, wherein:
the MTC server is communicated to the MSMC and is configured to send a triggering request message to the MSMC, wherein the triggering request message comprises a service identifier corresponding to the MTC server assigned by the MSMC and information of a requested group service;
the MSMC is configured to receive the triggering request message sent from the MTC server; establish a service session associated with the MTC server according to the information of the requested group service; and send a service request to the network device, wherein the service request comprises the service identifier and the information of the requested group service; and
the network device is configured to receive the service request sent from the MSMC; establish a service session with the MSMC according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

20. The system according to claim 19, wherein the MSMC is further configured to, when receiving uplink service data that is reported by the MTC device through the network device, collect related charging statistics according to the established service session, and converge and deliver the uplink service data to the MTC server; and when receiving downlink service data sent from the MTC server, deliver the downlink service data to the MTC device through a link with the network device.

21. A service processing system comprising:
at least one machine type communication (MTC) server; and
a network device, wherein:
the MTC server is configured to send a triggering request message to the network device, wherein the triggering request message comprises a service identifier corresponding to the MTC server and information of a requested group service; and
the network device is configured to receive the triggering request message sent from the MTC server; establish a corresponding service session according to the information of the requested group service; and acquire information of a corresponding mobility management entity (MME) or serving general packet radio service support node (SGSN) according to the service identifier and the information of the requested group service, and establish, through the MME or SGSN, a link with an MTC device corresponding to the requested group service.

22. The service processing system according to claim 21, further comprising: a machine to machine service management device MSMC, configured to receive an MTC device triggering request message sent from the machine type communication (MTC) server, wherein the MTC device triggering request message comprises the service identifier corresponding to the MTC server, service information requested for triggering, and an MTC device identifier requested for triggering; acquire, according to the MTC device identifier requested for triggering, information of an MME or SGSN where the MTC device is located, and establish a service session of the service identifier corresponding to the MTC server and a service session of the service information requested for triggering; and send an MTC device triggering request message carrying the MTC device identifier to the MME or SGSN, so that the MME or SGSN establishes a paging link of the MTC device.

23. A method processing service, executed by a machine to machine (M2M) service management device for managing a communication between a machine type communication (MTC) server and a network device, comprising:
receiving, by the M2M service management device, a triggering request message sent from the MTC server, wherein the triggering request message comprises a service identifier corresponding to the MTC server assigned by the M2M service management device and information of a requested group service;
establishing, by the M2M service management device, a service session associated with the MTC server according to the information of the requested group service; and
sending, by the M2M service management device, a service request to the network device, wherein the service request comprises the service identifier and the information of the requested group service to establish a corresponding service session with the M2M service management device according to the service identifier and the information of the requested group service, and links with at least two MTC devices corresponding to the requested group service.

24. The method according to claim 23, wherein before the sending the service request to the network device, the method further comprises:
acquiring information of a mobility management entity (MME) or serving general packet radio service support node (SGSN) where an MTC device corresponding to the requested group service is located; and
the sent service request further comprises the information of the MME or SGSN, so that the network device establishes, through the corresponding MME or SGSN, a link with the MTC device corresponding to the requested group service.

25. The method according to claim 24, further comprising any one of the following operations:
Operation 1: searching a local storage for the information of the MME or SGSN where the MTC device corresponding to the information of the requested group service is located;
Operation 2: sending a location query request to a home subscriber server (HSS), wherein the location query request comprises the information of the requested group service; requesting searching for the information of the mobility management entity (MME) or serving general packet radio service support node (SGSN) corresponding to the information of the requested group service; and receiving the information of the MME or SGSN, wherein the information of the MME or SGSN is returned by the HSS according to the location query request; and
Operation 3: receiving subscription information sent from the home subscriber server (HSS), and parsing the subscription information to acquire the information of the MME or SGSN.

26. The method according to claim 23, wherein before the establishing the corresponding service session according to the information of the requested group service, the method further comprises:
receiving a service configuration request message sent from the MTC server, wherein the service configuration request message comprises identifier information of the MTC server;
acquiring subscription information corresponding to the identifier information of the MTC server;
allocating a corresponding service identifier for a service of the MTC server;
establishing, according to the subscription information, a context corresponding to the service of the MTC server; and
sending the allocated service identifier to the MTC server.

27. The method according to claim 26, further comprising one of the following operations:
Operation A: searching a local storage for the subscription information corresponding to the identifier information of the MTC server; and
Operation B: sending a subscription request message to the HSS, wherein the subscription request message comprises the identifier information of the MTC server; and receiving the subscription information that is returned by the HSS according to the identifier information of the MTC server.

28. The method according to claim 27, wherein the service configuration request message further comprises information of a group service requested for configuration;

the subscription request message sent to the HSS further comprises the information of the group service requested for configuration; and the subscription information of the HSS is corresponding to the identifier information of the MTC server and the information of the group service requested for configuration.

29. The method according to claim 28, wherein if the group service requested for configuration comprises at least one of a periodic triggering service and monitoring service, the method further comprises:
 establishing a corresponding service session according to the information of the group service requested for configuration; and
 sending a periodic triggering and/or monitoring service request to the multimedia broadcast/multicast service network device, wherein the at least one of the periodic triggering and monitoring service request comprises the service identifier and information of at least one of a requested periodic triggering and monitoring service, so that the network device establishes a corresponding service session according to the service identifier and the information of the at least one of the requested periodic triggering and monitoring service, and establishes links with at least two MTC devices corresponding to the at least one of the requested periodic triggering and monitoring service.

30. The method according to claim 23, further comprising:
 collecting related charging statistics according to the established service session and converging and delivering the uplink service data to the MTC server if receiving uplink service data that is reported by the MTC device through the network device; and
 delivering the downlink service data to the MTC device through a link with the network device if receiving downlink service data sent from the MTC server.

31. The method according to claim 23, wherein the triggering request message is an MTC device triggering request message, and the triggering request message further comprises an MTC device identifier requested for triggering, the method further comprises:
 sending a location query request message to a home subscriber server (HSS), wherein the location query request message comprises the MTC device identifier; and
 sending an MTC device triggering request message carrying the MTC device identifier to the MME or SGSN when receiving the information of the MME or SGSN, wherein the information of the MME or the SGSN is returned by the HSS, so that the MME or SGSN establishes a paging link of the MTC device.

32. A method processing service comprising:
 receiving, by a network device, a service request or triggering request message sent from a machine to machine (M2M) service management device, wherein the service request comprises a service identifier corresponding to the MTC server assigned by the M2M service management device and information of a requested group service;
 establishing, by the network device, a service session with the M2M service management device according to the information of the requested group service; and
 acquiring, by the network device, information of a corresponding mobility management entity (MME) or serving general packet radio service support node (SGSN) according to the service identifier and the information of the requested group service; and
 establishing, by the network device, through the MME or SGSN, a link with an MTC device corresponding to the requested group service.

33. The method according to claim 32, wherein before the receiving a triggering request message sent from a machine to machine (M2M) service management device, the method further comprises:
 receiving a service configuration request message sent from the MTC server, wherein the service configuration request message comprises identifier information of the MTC server;
 acquiring subscription information corresponding to the identifier information of the MTC server;
 allocating a corresponding service identifier for a service of the MTC server;
 establishing, according to the subscription information, a context corresponding to the service of the MTC server; and
 sending the allocated service identifier to the MTC server.

34. The method according to claim 32, further comprising:
 collecting related charging statistics according to the established service session and converging and delivering the uplink service data to the MTC server if receiving uplink service data reported by the MTC device; and
 delivering the downlink service data to the MTC device through a link with the MTC device if receiving downlink service data sent from the MTC server.

* * * * *